US012518716B2

(12) United States Patent
Kim

(10) Patent No.: US 12,518,716 B2
(45) Date of Patent: Jan. 6, 2026

(54) DISPLAY DEVICE

(71) Applicant: LG Display Co., Ltd., Seoul (KR)

(72) Inventor: Donghwan Kim, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/384,609

(22) Filed: Oct. 27, 2023

(65) Prior Publication Data

US 2024/0257782 A1 Aug. 1, 2024

(30) Foreign Application Priority Data

Jan. 31, 2023 (KR) ........................ 10-2023-0012738

(51) Int. Cl.

| | |
|---|---|
| ***G09G 3/36*** | (2006.01) |
| ***G09G 3/3266*** | (2016.01) |
| ***G09G 3/3275*** | (2016.01) |

(52) U.S. Cl.

CPC ......... *G09G 3/3677* (2013.01); *G09G 3/3266* (2013.01); *G09G 3/3275* (2013.01); *G09G 3/3688* (2013.01); *G09G 2310/0297* (2013.01); *G09G 2310/08* (2013.01); *G09G 2330/06* (2013.01)

(58) Field of Classification Search

CPC ............... G09G 3/3677; G09G 3/3275; G09G 2310/0297; G09G 2310/08; G09G 2330/06

See application file for complete search history.

(56) References Cited

U.S. PATENT DOCUMENTS

| | | | | |
|---|---|---|---|---|
| 2003/0218588 A1* | 11/2003 | Kumagai ............. | G09G 3/3688 345/87 |
| 2008/0129652 A1* | 6/2008 | Park ..................... | G09G 3/3648 345/55 |
| 2008/0211760 A1* | 9/2008 | Baek .................... | G09G 3/3677 345/98 |
| 2016/0202818 A1 | 7/2016 | Hyun et al. | |
| 2018/0218665 A1 | 8/2018 | Nitobe | |

(Continued)

FOREIGN PATENT DOCUMENTS

| | | |
|---|---|---|
| JP | 2004-302035 A | 10/2004 |
| JP | 2008-134311 A | 6/2008 |
| JP | 2014-127218 A | 7/2014 |

(Continued)

*Primary Examiner* — Mariam Qureshi

(74) *Attorney, Agent, or Firm* — Birch, Stewart, Kolasch & Birch, LLP

(57) ABSTRACT

According to an aspect of the present disclosure, a display device includes a display panel having a display area and a non-display area adjacent to the display area, where the display area includes a plurality of pixels. The display device further includes a gate driver disposed in the non-display area of the display panel and configured to supply a gate signal to the plurality of pixels, and a data driver configured to supply a data voltage to the plurality of pixels and configured to supply a clock signal to the gate driver through a clock line. The display device also includes a clock pseudo line disposed in the non-display area of the display panel and applied with a clock pseudo signal with a phase inverted from a phase of the clock signal. By this configuration, the electromagnetic interference by the clock signal cancan be effectively removed or minimized.

20 Claims, 19 Drawing Sheets

(56) References Cited

U.S. PATENT DOCUMENTS

| | | | | |
|---|---|---|---|---|
| 2019/0288008 | A1* | 9/2019 | Park | G09G 3/3677 |
| 2022/0415261 | A1* | 12/2022 | Kim | G09G 3/006 |

FOREIGN PATENT DOCUMENTS

| | | | |
|---|---|---|---|
| JP | 2018-534613 | A | 11/2018 |
| KR | 10-2020-0069551 | A | 6/2020 |
| KR | 10-2021-0082824 | A | 7/2021 |
| KR | 10-2022-0094119 | A | 7/2022 |
| TW | 202011381 | A | 3/2020 |

* cited by examiner

DISPLAY DEVICE

CROSS-REFERENCE TO RELATED APPLICATIONS

This application claims priority to Korean Patent Application No. 10-2023-0012738 filed on Jan. 31, 2023, in the Korean Intellectual Property Office, the entire disclosure of which is hereby incorporated by reference into the present application.

BACKGROUND OF THE DISCLOSURE

Field

The present disclosure relates to a display device configured to reduce or minimize electromagnetic interference.

Discussion of the Related Art

As the world enters an information era, a display field has been rapidly developed. In response to this, various display devices having excellent performances such as thin-thickness, light weight, and low power consumption have been developed. Examples of such a display device include a liquid crystal display (LCD) device, an organic light emitting display (OLED) device, and the like.

The display device includes a display panel in which pixels for displaying images are disposed, and one or more driving circuits for driving the pixels. The driving circuits can include a data driver which is configured to supply a data voltage to data lines disposed in the display panel, a gate driver which sequentially supplies a gate signal to gate lines disposed in the display panel, a timing controller which controls the data driver and the gate driver, and the like.

In an electronic device, such as a display device, an electromagnetic interference (EMI) can be caused by various signals for driving the driving circuits. In that case, the performance of the display device can be affected due to the above-described electromagnetic interference.

SUMMARY OF THE DISCLOSURE

An object to be achieved by the present disclosure is to provide a display device which reduces or removes a level of the electromagnetic interference (EMI).

Objects of the present disclosure are not limited to the above-mentioned objects, and other objects, which are not mentioned above, can be clearly understood by those skilled in the art from the following descriptions.

In order to achieve the above-described objects, according to an aspect of the present disclosure, a display device includes a display panel including a display area having a plurality of pixels and a non-display area adjacent to the display area, a gate driver disposed in the non-display area of the display panel and configured to supply a gate signal to the plurality of pixels, a data driver configured to supply a data voltage to the plurality of pixels and configured to supply a clock signal to the gate driver through a clock line, and a clock pseudo line disposed in the non-display area of the display panel and applied with a clock pseudo signal with a phase inverted from a phase of the clock signal. By this configuration, the electromagnetic interference by the clock signal can be effectively removed or minimized.

Other detailed matters of the exemplary embodiments are included in the detailed description and the drawings.

According to an exemplary embodiments of the present disclosure, in the display device, an electromagnetic wave of a clock signal is completely cancelled by a clock pseudo signal so that the electromagnetic interference by the clock signal can be effectively removed.

According to an exemplary embodiments of the present disclosure, in the display device, an electromagnetic wave of a multiplexer (MUX) control signal is completely cancelled by a MUX pseudo signal so that the electromagnetic interference by the MUX control signal can be effectively removed.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
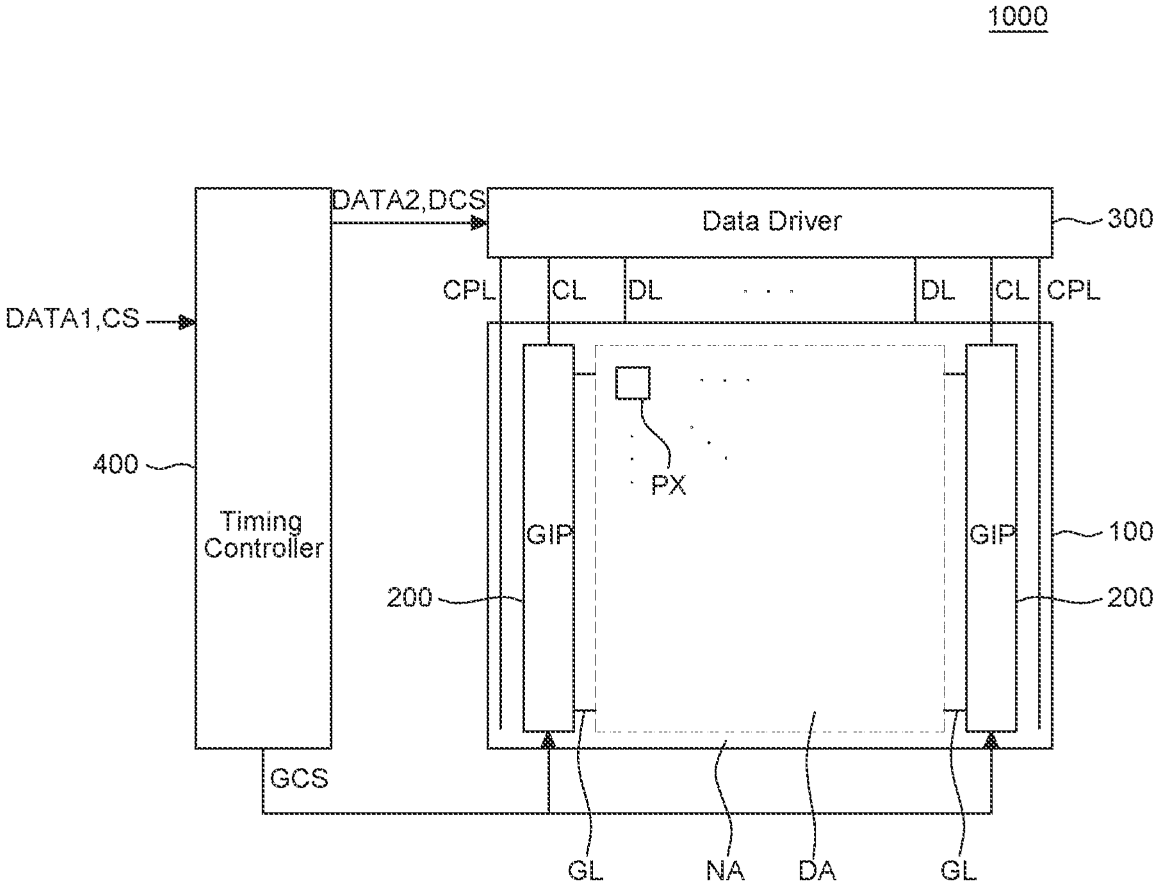
FIG. 1 is a block diagram illustrating a display device according to exemplary embodiments of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "over", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components and may not define order or sequence. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

The term "exemplary" is used to mean an example, and is interchangeably used with the term "example". Further, embodiments are example embodiments and aspects are example aspects. Any implementation described herein as an "example" is not necessarily to be construed as preferred or advantageous over other implementations.

Hereinafter, various exemplary embodiments of the present disclosure will be described in detail with reference to the accompanying drawings. All the components of each display device according to all embodiments of the present disclosure are operatively coupled and configured.

FIG. 1 is a block diagram illustrating a display device according to exemplary embodiments of the present disclosure.

Referring to FIG. 1, a display device 1000 according to exemplary embodiments of the present disclosure can include a display panel 100, a gate driver 200, a data driver 300, and a timing controller 400.

The display panel 100 can include a display area DA (e.g., active area) in which images are displayed and a non-display area NA (e.g., non-active area). The non-display area NA can be located adjacent to the display area DA, and may not overlap with the display area DA. In an example, the non-display area NA can surround the display area DA entirely or in part.

Pixels PX for displaying images can be disposed on the display area DA of the display panel 100. Further, a plurality of gate lines GL and a plurality of data lines DL can be disposed on the display area DA of the display panel 100. The gate lines GL can be disposed in one direction (for example, a first direction DR1, see FIG. 2A) and the data lines DL can be disposed in a direction (for example, a second direction DR2, see FIG. 2A) different from the one direction.

Each of the pixels PX can be connected to a corresponding gate line, among the gate lines GL, and a corresponding data line, among the data lines DL. Therefore, a gate signal and a data voltage can be applied to each pixel PX, through the gate line and the data line. Each pixel PX can implement the gray scale by the applied gate signal and data voltage and finally, the image can be displayed on the display area DA of the display panel 100 by the gray scales displayed by each of the pixels PX.

Various signal lines, power lines, and a gate driver 200 to which a signal for controlling an operation of the pixels PX disposed in the display area DA is transmitted can be disposed on the non-display area NA of the display panel 100.

For example, the gate driver 200 can be disposed in a gate in panel (GIP) manner to be disposed in the display panel 100.

Specifically, in the non-display area NA of the display panel 100, a clock line CL which is connected to the gate driver 200 to supply a clock signal to the gate driver 200 can be disposed. In the non-display area NA of the display panel 100, a clock pseudo line CPL which is disposed at the outside of the gate driver 200 to be applied with a clock pseudo signal can be disposed. The clock pseudo signal has a phase inverted from a phase of the clock signal. The clock pseudo signal can be referred to as an inverted clock signal.

The timing controller 400 (or a timing control circuit) can receive an input image signal DATA1 and an input control signal CS from the outside (for example, a host system).

The timing controller 400 generates image data DATA2 corresponding to an operation condition of pixels PX based on the input image signal DATA1 to supply the image data to the data driver 300.

The timing controller 400 can generate control signals for controlling the gate driver 200 and the data driver 300 based on the input control signal CS. For example, the input control signal CS can include timing signals, such as a clock signal, a horizontal synchronization signal, a vertical synchronization signal, and a data enable signal. Here, the horizontal synchronization signal is a signal representing a time taken to display one horizontal line of a screen and the vertical synchronization signal is a signal representing a time taken to display a screen of one frame. The data enable signal can correspond to a signal indicating a period for which a data voltage is supplied to the pixel PX.

The timing controller 400 generates a gate control signal GCS which controls an operation timing of the gate driver 200 using timing signals included in the input control signal CS to supply the gate control signal to the gate driver 200.

The timing controller 400 generates a data control signal DCS which controls an operation timing of the data driver 300 using timing signals included in the input control signal CS to supply the data control signal to the data driver 300.

The data driver 300 (or a data driving circuit) can receive a data control signal DCS from the timing controller 400 and convert image data DATA2 into an analog data voltage (for example, a data voltage) in response to the data control signal DCS. The data driver 300 outputs a data voltage to the data lines DL to supply the data voltage to the pixels PX.

The data driver 300 receives the clock signal from the timing controller 400 to supply the clock signal to the gate driver 200 through the clock line CL.

The gate driver 200 (or a gate driving circuit, a scan driving unit, a scan driving circuit) receives a gate control signal GCS from the timing controller 400 and receives the clock signal from the data driver 300 to sequentially supply the gate signal to the gate lines GL in response to the gate control signal GCS and the clock signal. To this end, the gate driver 200 can include a shift register, a level shifter, or the like. The gate control signal GCS can include a gate start signal, and gate enable signals for generating gate signals.

The display device 1000 according to exemplary embodiments of the present disclosure can be various types of display devices, such as a liquid crystal display device, an organic light emitting display device, a plasma display device, and a quantum dot display device.

For example, when the display device 1000 according to the exemplary embodiments of the present disclosure is a liquid crystal display device, the display panel 100 includes a liquid crystal layer formed between two sheets of substrates (for example, an upper substrate and a lower substrate). Further, the display panel can be operated in any known mode, such as a twisted nematic (TN) mode, a vertical alignment mode, an in plane switching (IPS) mode, and a fringe field switching (FFS) mode.

A black matrix and a color filter can be formed on the upper substrate of the display panel 100 and a thin film transistor and a pixel PX can be formed on the lower substrate of the display panel 100. The display panel 100 can be implemented with a color filter on TFT (COT) structure and in this case, the black matrix and the color filter can be formed on the lower substrate of the display panel 100.

Further, the common electrode to which a common voltage is supplied can be formed on the upper substrate or the lower substrate of the display panel 100. Polarizers can be attached to the upper substrate and the lower substrate of the display panel 100, respectively and an alignment film can be formed in an inner surface which is in contact with the liquid crystal to set a tilt angle of the liquid crystal.

A column spacer can be formed between the upper substrate and the lower substrate of the display panel 100 to maintain a cell gap of a liquid crystal cell. In the case of the liquid crystal display device, a backlight unit is disposed below the rear surface of the lower polarizer of the display panel 100 and the backlight unit can be implemented to be an edge type, a direct type, or the like.

Here, in the liquid crystal display device, a plurality of touch electrodes which is disposed on the display panel 100 and senses a touch of the user, and the like can be common electrodes to which a common voltage for display driving is applied.

As another example, when the display device 1000 according to the exemplary embodiments of the present disclosure is an organic light emitting display device, the display device can include a first electrode (anode electrode), an organic emission layer, a second electrode (cathode electrode) which configure an organic light emitting diode, an encapsulation layer having an encapsulating function, and a touch sensor metal layer.

Here, in the organic light emitting display device, the plurality of touch electrodes which is disposed on the display panel 100 and senses the touch of the user, and the like can be formed on a touch sensor metal layer or formed on a second electrode layer which configures the cathode electrode of the organic light emitting diode.

In the meantime, the common voltage which is applied to the common electrode or the touch electrode can be set as a direct current (DC) voltage which is applied at a specific voltage level for a predetermined time when a level of a data voltage supplied to the display panel 100 is changed during a driving period of the display device 1000. Further, the common voltage which is applied to the common electrode or the touch electrode can be referred to as a display voltage or some other name depending on a type such as the liquid crystal display device or the organic light emitting display device.

In the meantime, a noise which can be generated in the display device 1000 can include an electromagnetic wave which is generated by the display panel 100 including an electromagnetic wave generated by the clock signal which is supplied to the gate driver 200 and/or an electromagnetic wave generated by a multiplexer (MUX) control signal which controls a multiplexer connected to the source driving integrated circuit of a data driver to be described below.

As described above, a system stability of the display device 1000 can be degraded due to the noise which can be generated in the display device 1000, for example, due to the influence of the electromagnetic interference (EMI). In this case, another signal (voltage) which is necessary for the image display of the display device 1000 is also affected so that the display performance can be degraded.

Accordingly, in the display device 1000 according to the exemplary embodiments of the present disclosure, a plurality of pseudo lines is disposed in the non-display area NA of the display panel 100 to cancel the noise which can be generated in the display device 1000. A clock pseudo signal which cancels the electromagnetic wave generated by the clock signal and a MUX pseudo signal which cancels the electromagnetic wave generated by the MUX control signal are applied to the plurality of pseudo lines. By doing this, a level of the electromagnetic interference of the display device 1000 can be improved.

This will be described below in more detail with reference to FIG. 2A and subsequent drawings.

Figure 2A:
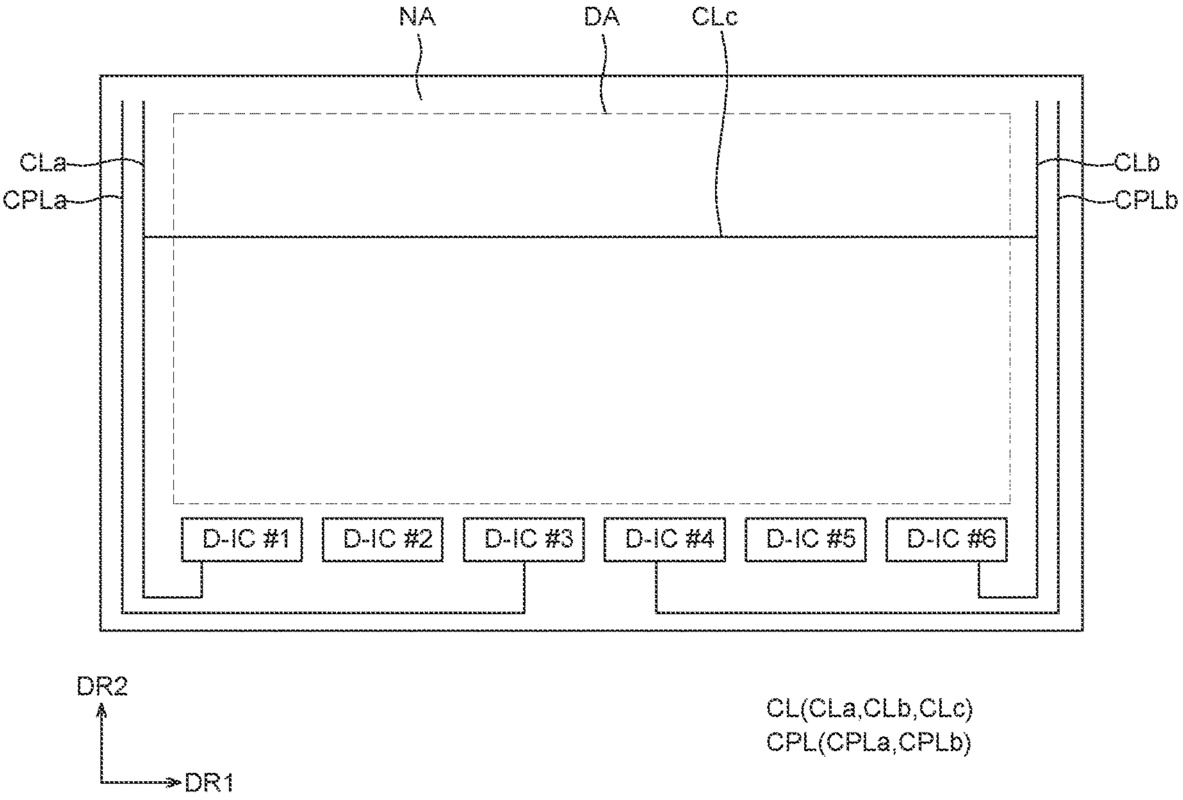
FIGS. 2A and 2B are views illustrating a clock line and a clock pseudo line disposed in a non-display area of the display device of FIG. 1.
Figure 2B:
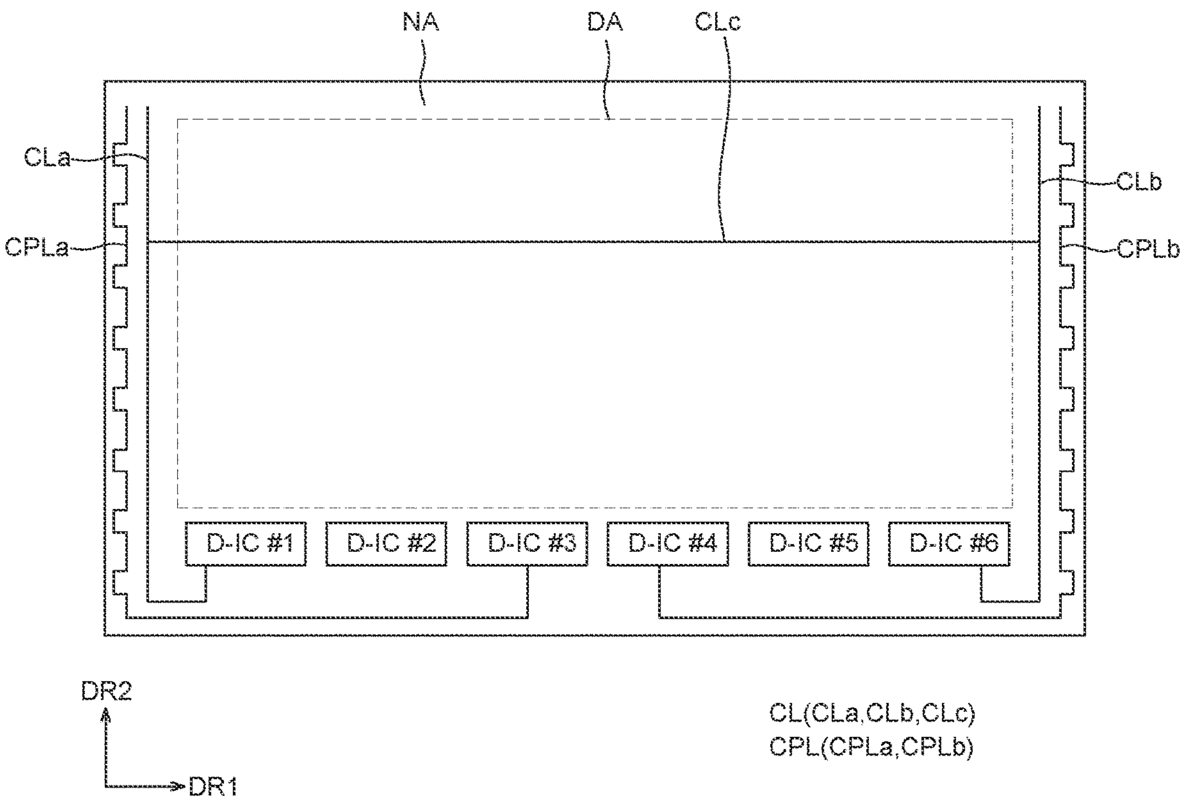

FIGS. 2A and 2B are views illustrating an example of a clock line and a clock pseudo line disposed in a non-display area of the display device of FIG. 1.

Referring to FIGS. 1, 2A, and 2B, as described with reference to FIG. 1, a display panel 100 can include a display area DA in which the image is displayed and a non-display area NA adjacent to the display area DA.

The display area DA can be parallel to a surface defined by a first directional axis (for example, an axis extending in a first direction DR1) and a second directional axis (for example, an axis extending in a second direction DR2). However, the first and second directions DR1 and DR2 are as illustrated as merely examples, and the first and second directions DR1 and DR2 are relative concepts to be converted to the other directions, for example.

A plurality of pixels PX can be disposed in the display area DA. Each of the pixels PX can be connected to a corresponding gate line, among the gate lines GL, and a corresponding data line, among the data lines DL. According to the exemplary embodiment, each of the pixels PX can include a driving transistor, at least one switching transistor, a light emitting diode, a storage capacitor, and the like.

Referring to FIG. 1, the display panel 100 can include gate lines GL, data lines DL, a clock line CL, and a clock pseudo line CPL.

In one exemplary embodiment, in the display area DA of the display panel 100, the gate lines GL can extend in the first direction DR1 and the data lines DL can extend in the second direction DR2. In the non-display area NA of the display panel 100, the clock line CL and the clock pseudo line CPL can extend in the second direction DR2.

Further, referring to FIGS. 2A and 2B, the data driver can include a plurality of source driving integrated circuits D-IC #1, . . . , D-IC #6 disposed in the first direction DR1.

The plurality of source driving integrated circuits D-IC #1, . . . , D-IC #6 can supply a data voltage to the data lines DL. Further, the plurality of source driving integrated circuits D-IC #1, . . . , D-IC #6 can supply a clock signal to the gate driver GIP through the clock line CL. The plurality of source driving integrated circuits D-IC #1, . . . , D-IC #6 can supply a clock pseudo signal to the clock pseudo line CPL.

In one exemplary embodiment, the plurality of source driving integrated circuits D-IC #1, . . . , D-IC #6 is configured by an integrated circuit IC to be attached onto the display panel 100 by a chip on glass (COG) manner, a chip on plastic (COP) manner, or an ultrasonic bonding manner.

Referring to FIGS. 2A and 2B, the clock line CL can include a first clock line CLa and a second clock line CLb which are disposed on both sides of the display area DA in the first direction DR1 and extend in the second direction DR2. As a variation, the first and/or second clock lines can be disposed on only one side or additional sides of the display area DA.

The first clock line CLa and the second clock line CLb can be electrically connected to the source driving integrated circuits D-IC #1 and D-IC #6 which are disposed at the outermost sides, among the plurality of source driving integrated circuits D-IC #1, . . . , D-IC #6.

Specifically, the first clock line CLa is connected to a first source driving integrated circuit D-IC #1 which is the most adjacent to the first clock line CLa to be applied with a clock signal. The second clock line CLb is connected to a sixth source driving integrated circuit D-IC #6 which is the most adjacent to the second clock line CLb to be applied with a clock signal.

The clock line CL can further include a third clock line CLc which extends in the first direction DR1 in the display area DA and connects the first clock line CLa and the second clock line CLb. Therefore, the first clock line CLa and the second clock line CLb are electrically connected by the third clock line CLc so that the clock signal can be stably supplied.

In the meantime, the clock pseudo line CPL can include a first clock pseudo line CPLa and a second clock pseudo line CPLb disposed at the outsides of the first clock line CLa and the second clock line CLb.

Specifically, the first clock pseudo line CPLa is disposed at one side of the first clock line CLa with respect to the first direction DR1 to extend to the second direction DR2. The second clock pseudo line CPLb is disposed at the other side of the second clock line CLb with respect to the first direction DR1 to extend to the second direction DR2.

As illustrated in FIG. 2A, the first clock pseudo line CPLa and the second clock pseudo line CPLb can have a straight line shape. However, it is not limited thereto and as illustrated in FIG. 2B, the first clock pseudo line CPLa and the second clock pseudo line CPLb can have a wavy shape. For example, the first clock pseudo line CPLa and the second clock pseudo line CPLb can have a square wave shape or a sine wave shape. Therefore, the entire lengths of each of the first clock pseudo line CPLa and the second clock pseudo line CPLb can be increased. In addition, the shapes of the first clock pseudo line CPLa and the second clock pseudo line CPLb are not limited thereto, for example, the first clock pseudo line CPLa and the second clock pseudo line CPLb may have a Zigzag wavy shape.

In the meantime, the first clock pseudo line CPLa and the second clock pseudo line CPLb can be connected to the source driving integrated circuits D-IC #2, . . . , D-IC #4 disposed between the source driving integrated circuits D-IC #1 and D-IC #6 connected to the clock line CL.

For example, each of the first clock pseudo line CPLa and the second clock pseudo line CPLb can be connected to any one of the second to fourth source driving integrated circuits D-IC #2, . . . , D-IC #4 disposed between the first source driving integrated circuit D-IC #1 and the sixth source driving integrated circuit D-IC #6 to be applied with a clock pseudo signal.

For example, the first clock pseudo line CPLa can be connected to a third source driving integrated circuit D-IC #3 disposed between the first source driving integrated circuit D-IC #1 and the sixth source driving integrated circuit D-IC #6. The first clock pseudo line CPLa can be applied with a clock pseudo signal from the third source driving integrated circuit D-IC #3.

The second clock pseudo line CPLb can be connected to a fourth source driving integrated circuit D-IC #4 disposed between the first source driving integrated circuit D-IC #1 and the sixth source driving integrated circuit D-IC #6. The second clock pseudo line CPLb can be applied with a clock pseudo signal from the fourth source driving integrated circuit D-IC #4.

For example, as illustrated in FIG. 2A, each of the first clock pseudo line CPLa and the second clock pseudo line CPLb is connected to the source driving integrated circuits D-IC #2, . . . , D-IC #4 disposed between the first source driving integrated circuit D-IC #1 and the sixth source driving integrated circuit D-IC #6 connected to the clock line CL. Therefore, the length of each of the first clock pseudo line CPLa and the second clock pseudo line CPLb can be longer than the length of each of the first clock line CLa and the second clock line CLb.

Further, as illustrated in FIG. 2B, each of the first clock pseudo line CPLa and the second clock pseudo line CPLb is formed to have a wavy shape, rather than a straight line shape. Therefore, the length of each of the first clock pseudo line CPLa and the second clock pseudo line CPLb can be longer than the length of each of the first clock line CLa and the second clock line CLb.

The source driving integrated circuits D-IC #1, D-IC #2, D-IC #3, D-IC #4, D-IC #5, and D-IC #6 are illustrated in FIG. 2A and FIG. 2B, but the number of the source driving integrated circuits are not limited thereto. For example, the number of the source driving integrated circuits is n, where n is integer greater or equal to 4.

Figure 3:
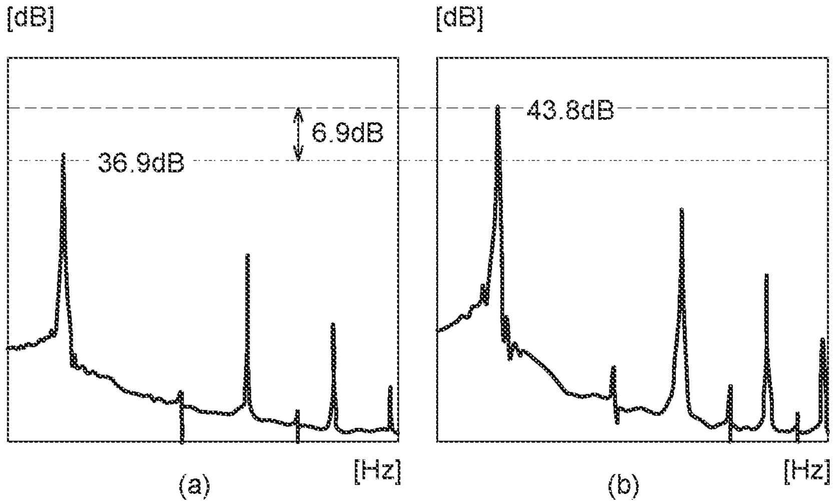
FIG. 3 shows a graph for explaining a radiation amount of a clock pseudo signal according to a length of a clock pseudo line.

FIG. 3 shows a graph for explaining a radiation amount of a clock pseudo signal according to a length of a clock pseudo line.

Specifically, a graph (a) of FIG. 3 illustrates a radiation amount of a clock pseudo signal applied to a clock pseudo line which has a shorter length. Specifically, the graph (b) of FIG. 3 illustrates a radiation amount of a clock pseudo signal applied to a clock pseudo line which has a longer length. Here, X-axes of the graph (a) and the graph (b) of FIG. 3 refer to a frequency of the clock pseudo signal and Y-axes refer to a radiation amount.

The longer the length of the clock pseudo line, the more the radiation amount of the clock pseudo signal applied to the clock pseudo line.

For example, as illustrated in the graph (a) of FIG. 3, a radiation amount of the clock pseudo signal applied to the clock pseudo line which has a shorter length is measured as 36.9 dB. Further, as illustrated in the graph (b) of FIG. 3, a radiation amount of the clock pseudo signal applied to the clock pseudo line which has a longer length is measured as 43.8 dB. For example, it is confirmed that as the length of the clock pseudo line is increased, a radiation amount of the clock pseudo signal is increased by approximately 6.9 dB.

FIG. 3 only illustrates examples that the radiation amounts of the clock pseudo signal applied to the clock pseudo line are measured as 36.9 dB and 43.8 dB, but the radiation amount of the clock pseudo signal applied to the clock pseudo line is not limited thereto, the measuring value of the radiation amount of the clock pseudo signal applied to the clock pseudo line changes depending on the length of the clock pseudo line.

In summary, the larger the length of the clock pseudo line, the more the radiation amount of the clock pseudo signal applied to the clock pseudo line.

Figure 4:
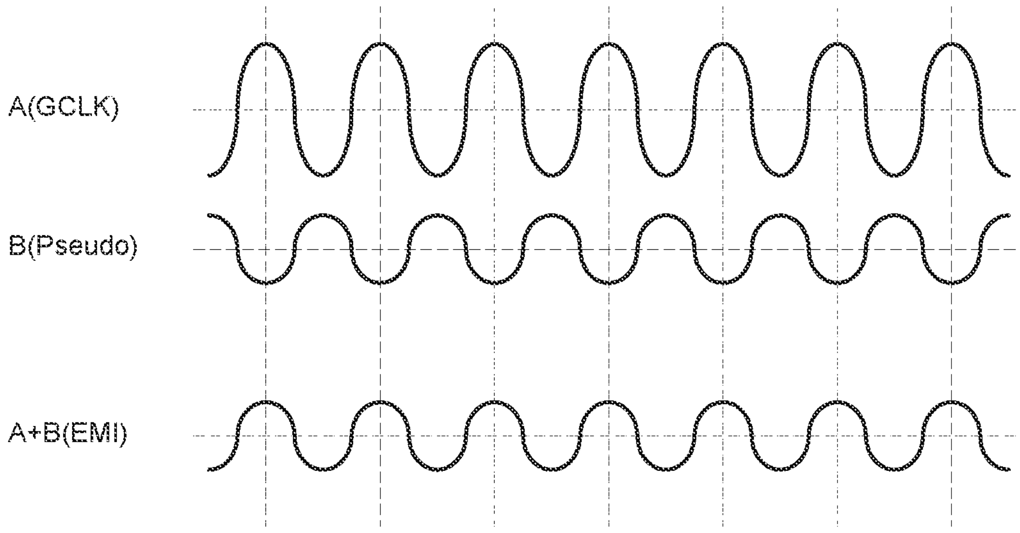
FIGS. 4 and 5 show graphs for explaining destructive interference of an electromagnetic interference generated in a display device.
Figure 5:
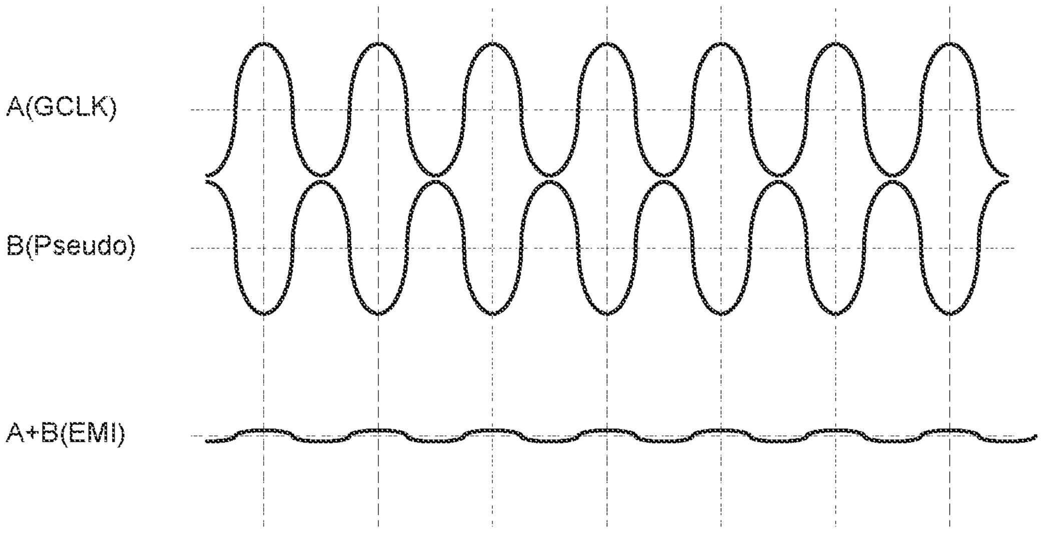

FIGS. 4 and 5 show graphs for explaining destructive interference of an electromagnetic interference generated in a display device.

Specifically, FIG. 4 shows a graph for explaining an electromagnetic interference when the entire length of the clock pseudo line CPL is shorter than a length of the clock line CL. FIG. 5 shows a graph for explaining an electromagnetic interference when the entire length of the clock pseudo line CPL is equal to a length of the clock line CL.

As illustrated in FIGS. 2A and 2B, as the size of the display device is increased, in order to stably transmit the clock signal, the third clock line CLc which connects the first clock line CLa and the second clock line CLb can be further formed. Therefore, the entire length of the clock line CL becomes larger than the entire length of the clock pseudo line CPL so that the entire length of the clock pseudo line CPL is shorter than the entire length of the clock line CL.

An amount of the signal is proportional to a length of a wiring line to which the signal is applied so that as illustrated in FIG. 4, a radiation amount A(GCLK) of the clock signal can be larger than a radiation amount B(Pseudo) of the clock pseudo signal.

Therefore, the electromagnetic wave of the clock signal is not completely cancelled by the clock pseudo signal so that there is a problem in that the electromagnetic interference A+B(EMI) still exists.

Therefore, in the display device according to one exemplary embodiment of the present disclosure, as illustrated in FIG. 2A, each of the first clock pseudo line CPLa and the second clock pseudo line CPLb is connected to the source driving integrated circuits D-IC #2, . . . , D-IC #4 disposed between the first source driving integrated circuit D-IC #1 and the sixth source driving integrated circuit D-IC #6 connected to the clock line CL. Therefore, the length of each of the first clock pseudo line CPLa and the second clock pseudo line CPLb can be longer than the length of each of the first clock line CLa and the second clock line CLb.

Further, as illustrated in FIG. 2B, each of the first clock pseudo line CPLa and the second clock pseudo line CPLb is formed to have a wavy shape, rather than a straight line shape. Therefore, the length of each of the first clock pseudo line CPLa and the second clock pseudo line CPLb can be longer than the length of each of the first clock line CLa and the second clock line CLb.

As a result, in the display device according to one exemplary embodiment of the present disclosure, the entire length of the clock pseudo line CPL can be equal to the entire length of the clock line CL.

A radiation amount of the signal is proportional to a length of a wiring line to which the signal is applied so that as illustrated in FIG. 5, a radiation amount A(GCLK) of the clock signal can be equal to a radiation amount B(Pseudo) of the clock pseudo signal.

Therefore, the electromagnetic wave of the clock signal can be completely cancelled by the clock pseudo signal so that the electromagnetic interference A+B(EMI) can be effectively removed.

Hereinafter, a display device according to another exemplary embodiment of the present disclosure will be described. The difference between the display device according to the exemplary embodiment of the present disclosure and a display device according to another exemplary embodiment of the present disclosure is a clock pseudo line CPL, so that this will be described in detail.

For the convenience of description, the redundant description for the same component in the display device according to the exemplary embodiment of the present disclosure and the display device according to another exemplary embodiment of the present disclosure is omitted or briefly provided. Like reference numerals are used for like components.

Figure 6A:
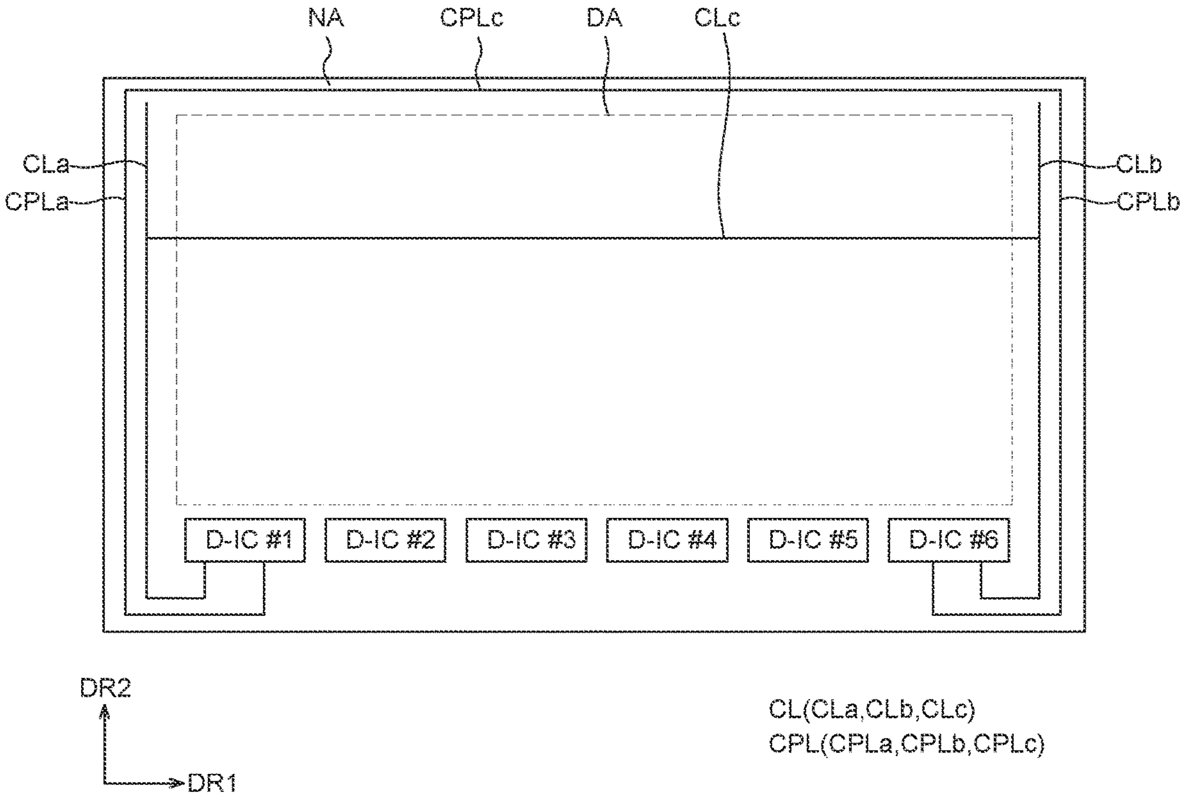
FIGS. 6A and 6B are views illustrating a clock line and a clock pseudo line disposed in a non-display area of a display device according to another exemplary embodiment of the present disclosure.
Figure 6B:
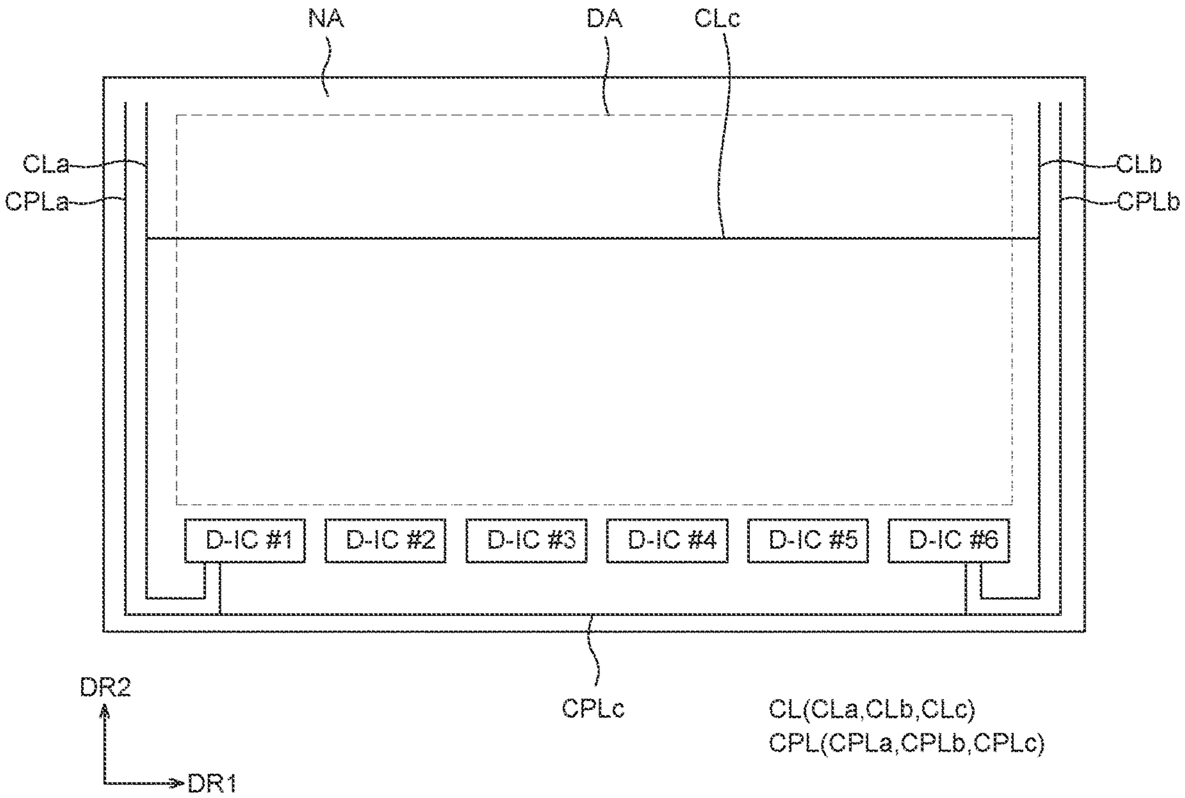

FIGS. 6A and 6B are views illustrating a clock line and a clock pseudo line disposed in a non-display area of a display device according to another exemplary embodiment of the present disclosure.

In the display device according to another exemplary embodiment of the present disclosure, the clock pseudo line CPL disposed in the non-display area NA can include not only the first clock pseudo line CPLa and the second clock pseudo line CPLb, but also the third clock pseudo line CPLc. The third clock pseudo line CPLc connects the first clock pseudo line CPLa and the second clock pseudo line CPLb.

As illustrated in FIGS. 6A and 6B, each of the first clock pseudo line CPLa and the second clock pseudo line CPLb can be connected to the source driving integrated circuit connected to the clock line CL.

For example, the first clock pseudo line CPLa can be connected to the first source driving integrated circuit D-IC

#1. The first clock pseudo line CPLa can be applied with a clock pseudo signal from the first source driving integrated circuit D-IC #1.

The second clock pseudo line CPLb can be connected to the sixth source driving integrated circuit D-IC #6. The second clock pseudo line CPLb can be applied with a clock pseudo signal from the sixth source driving integrated circuit D-IC #6.

As illustrated in FIG. 6A, the third clock pseudo line CPLc is disposed at one side (an upper side in FIG. 6A) with respect to the second direction DR2 and extends in the first direction DR1 to electrically connect the first clock pseudo line CPLa and the second clock pseudo line CPLb. For example, the third clock pseudo line CPLc may extend in the first direction DR1 and be disposed at one side (for example, an upper side in FIG. 6A) of the non-display region NA away from the source driving integrated circuit.

In some exemplary embodiments, as illustrated in FIG. 6B, the third clock pseudo line CPLc is disposed at the other side (a lower side in FIG. 6A) with respect to the second direction DR2 and extends in the first direction DR1 to electrically connect the first clock pseudo line CPLa and the second clock pseudo line CPLb. For example, the third clock pseudo line CPLc may extend in the first direction DR1 and be disposed at the other side (for example, a lower side in FIG. 6A) of the non-display region NA close to the source driving integrated circuit.

As illustrated in FIGS. 6A and 6B, the length of the third clock pseudo line CPLc can be equal to or substantially equal to the third clock line CLc which connects the first clock line CLa and the second clock line CLb.

As a result, in the display device according to another exemplary embodiment of the present disclosure, the entire length of the clock pseudo line CPL can be equal to the entire length of the clock line CL.

A radiation amount of the signal is proportional to a length of a wiring line to which the signal is applied so that a radiation amount of the clock signal applied to the clock line CL and a radiation amount of the clock pseudo signal applied to the clock pseudo line CPL can be the equal level.

Therefore, the electromagnetic wave of the clock signal can be effectively cancelled by the clock pseudo signal so that the electromagnetic interference can be effectively removed.

Hereinafter, a display device according to still another exemplary embodiment (third exemplary embodiment) of the present disclosure will now be described. The difference between the display device according to the exemplary embodiment of the present disclosure and a display device according to still another exemplary embodiment (third exemplary embodiment) of the present disclosure is a clock pseudo line CPL_1, so that this will be described in detail.

For the convenience of description, the redundant description for the same component in the display device according to one exemplary embodiment of the present disclosure and the display device according to still another exemplary embodiment (third exemplary embodiment) of the present disclosure is omitted or briefly provided. Like reference numerals are used for like components.

Figure 7:
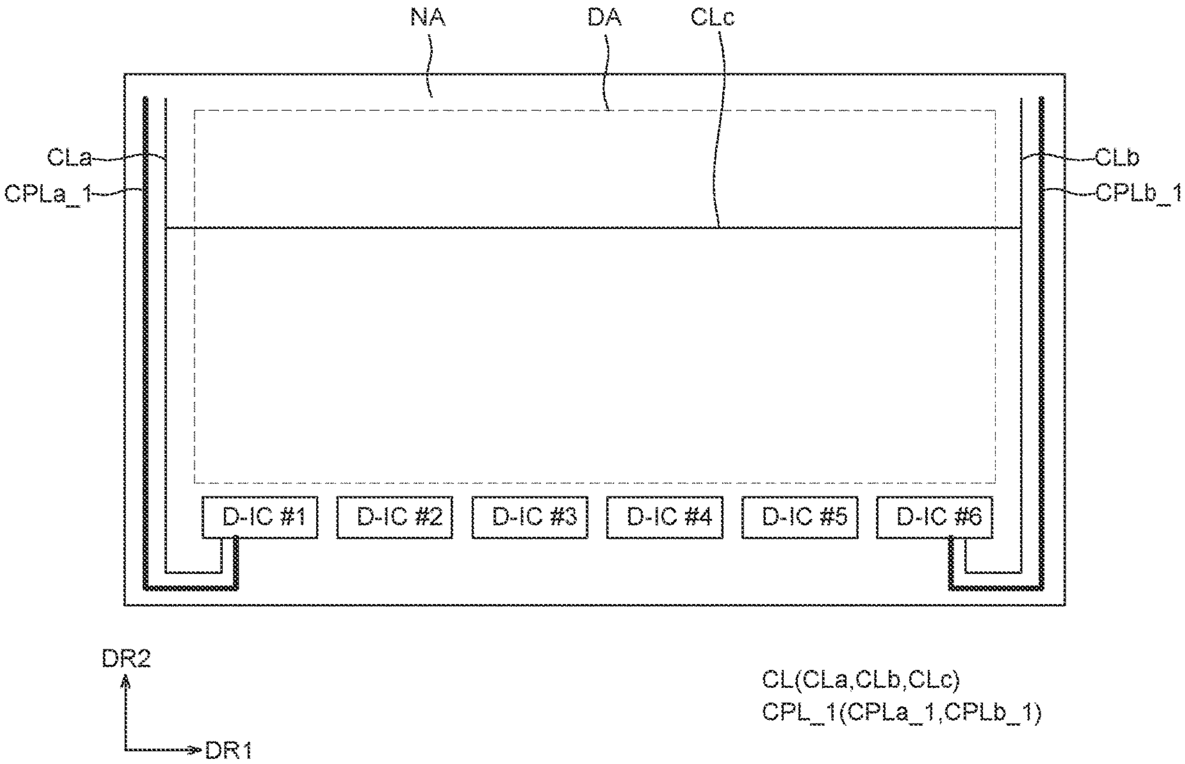
FIG. 7 is a view illustrating a clock line and a clock pseudo line disposed in a non-display area of a display device according to still another exemplary embodiment of the present disclosure.

FIG. 7 is a view illustrating a clock line and a clock pseudo line disposed in a non-display area of a display device according to still another exemplary embodiment (third exemplary embodiment) of the present disclosure.

In the display device according to still another exemplary embodiment (third exemplary embodiment) of the present disclosure, a width of the clock pseudo line CPL_1 disposed on the non-display area NA can be larger than a width of the clock line CL.

As illustrated in FIG. 7, widths of the first clock pseudo line CPLa_1 and the second clock pseudo line CPLb_1 can be larger than widths of the first clock line CLa and the second clock line CLb.

In the meantime, the first clock pseudo line CPLa_1 and the second clock pseudo line CPLb_1 can be connected to the source driving integrated circuit connected to the clock line CL.

For example, the first clock pseudo line CPLa_1 can be connected to the first source driving integrated circuit D-IC #1. The first clock pseudo line CPLa_1 can be applied with a clock pseudo signal from the first source driving integrated circuit D-IC #1.

The second clock pseudo line CPLb_1 can be connected to the sixth source driving integrated circuit D-IC #6. The second clock pseudo line CPLb_1 can be applied with a clock pseudo signal from the sixth source driving integrated circuit D-IC #6.

Figure 8:
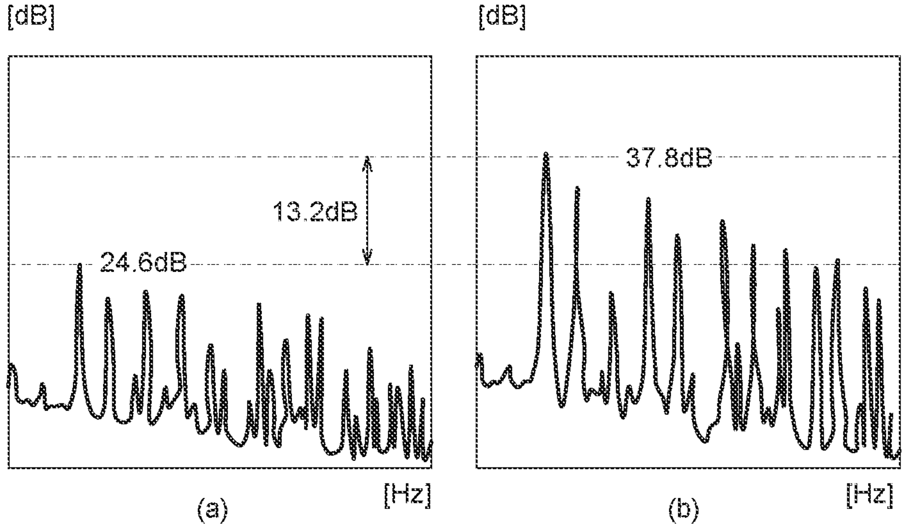
FIG. 8 shows a graph for explaining a radiation amount of a clock pseudo signal according to a width of a clock pseudo line.

FIG. 8 shows a graph for explaining a radiation amount of a clock pseudo signal according to a width of a clock pseudo line.

Specifically, a graph (a) of FIG. 8 illustrates a radiation amount of a clock pseudo signal applied to a clock pseudo line with a smaller width. Specifically, the graph (b) of FIG. 8 illustrates a radiation amount of a clock pseudo signal applied to a clock pseudo line CPL_1 with a larger width. Here, X-axes of the graph (a) and the graph (b) of FIG. 8 refer to a frequency of the clock pseudo signal and Y-axes refer to a radiation amount.

The larger the width of the clock pseudo line CPL_1, the more the radiation amount of the clock pseudo signal applied to the clock pseudo line CPL_1.

For example, as illustrated in the graph (a) of FIG. 8, a radiation amount of the clock pseudo signal applied to the clock pseudo line with a smaller width is measured as 24.6 dB. Further, as illustrated in the graph (b) of FIG. 8, a radiation amount of the clock pseudo signal applied to the clock pseudo line CPL_1 with a larger width is measured as 37.8 dB. For example, it is confirmed that as the width of the clock pseudo line CPL_1 is increased, a radiation amount of the clock pseudo signal is increased by approximately 13.2 dB.

FIG. 8 only illustrates examples that the radiation amounts of the clock pseudo signal applied to the clock pseudo line CPL_1 are measured as 24.6 dB and 37.8 dB, but the radiation amount of the clock pseudo signal applied to the clock pseudo line CPL_1 is not limited thereto, the measuring value of the radiation amount of the clock pseudo signal applied to the clock pseudo line CPL_1 changes depending on the width of the clock pseudo line.

In summary, the larger the width of the clock pseudo line CPL_1, the more the radiation amount of the clock pseudo signal applied to the clock pseudo line CPL_1.

Therefore, a radiation amount of the clock signal applied to the clock line CL and a radiation amount of the clock pseudo signal applied to the clock pseudo line CPL_1 can be the equal level.

Therefore, the electromagnetic wave of the clock signal can be effectively cancelled by the clock pseudo signal so that the electromagnetic interference can be effectively removed.

Hereinafter, a display device according to still another exemplary embodiment (fourth exemplary embodiment) of the present disclosure will be described. The difference between the display device according to the exemplary embodiment of the present disclosure and a display device according to still another exemplary embodiment (fourth exemplary embodiment) of the present disclosure is a clock pseudo line CPL_2, so that this will be described in detail.

For the convenience of description, the redundant description for the same component in the display device according to one exemplary embodiment of the present disclosure and the display device according to still another exemplary embodiment (fourth exemplary embodiment) of the present disclosure is omitted or briefly provided. Like reference numerals are used for like components.

Figure 9A:
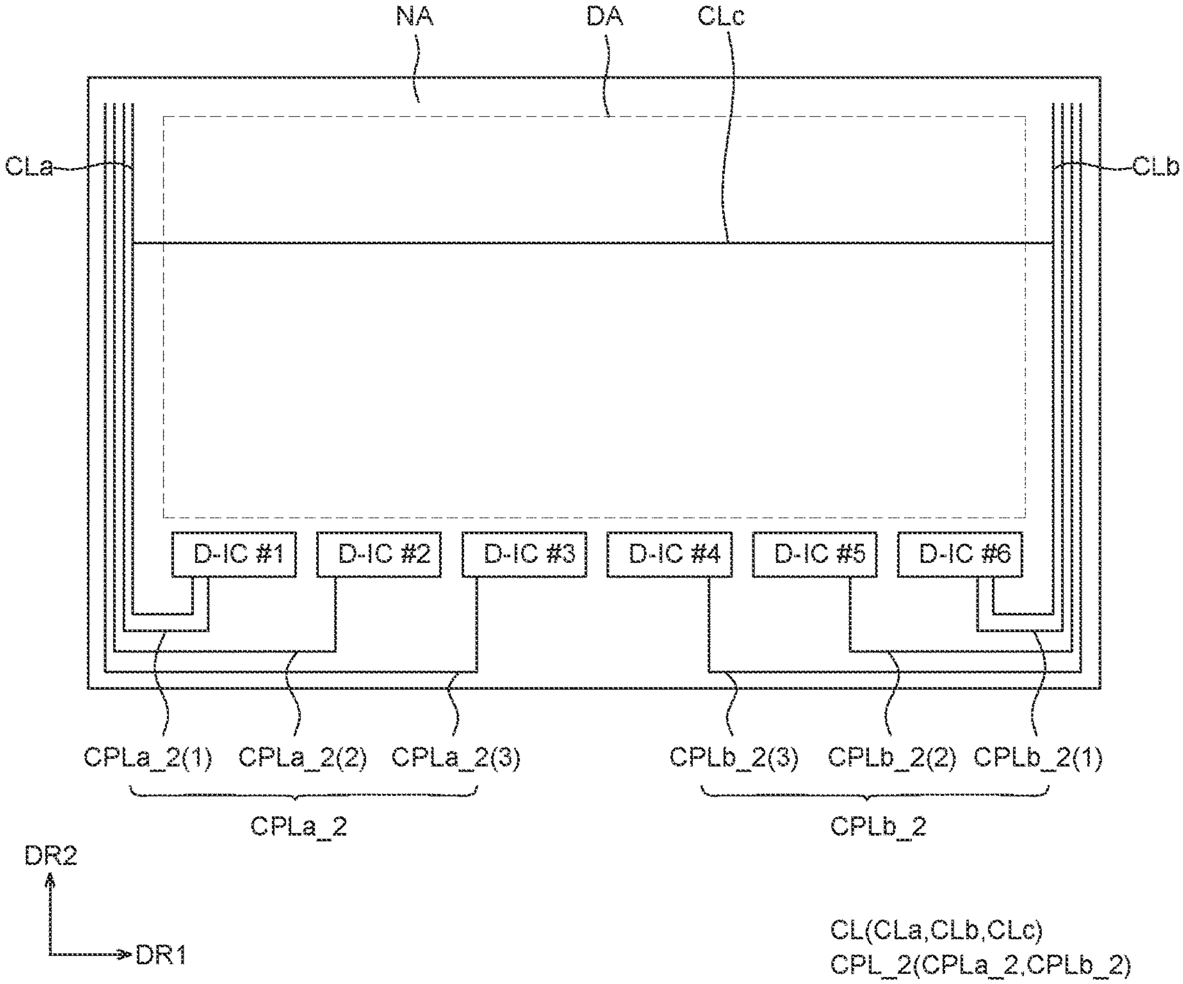
FIGS. 9A and 9B are views illustrating a clock line and a clock pseudo line disposed in a non-display area of a display device according to still another exemplary embodiment of the present disclosure.
Figure 9B:
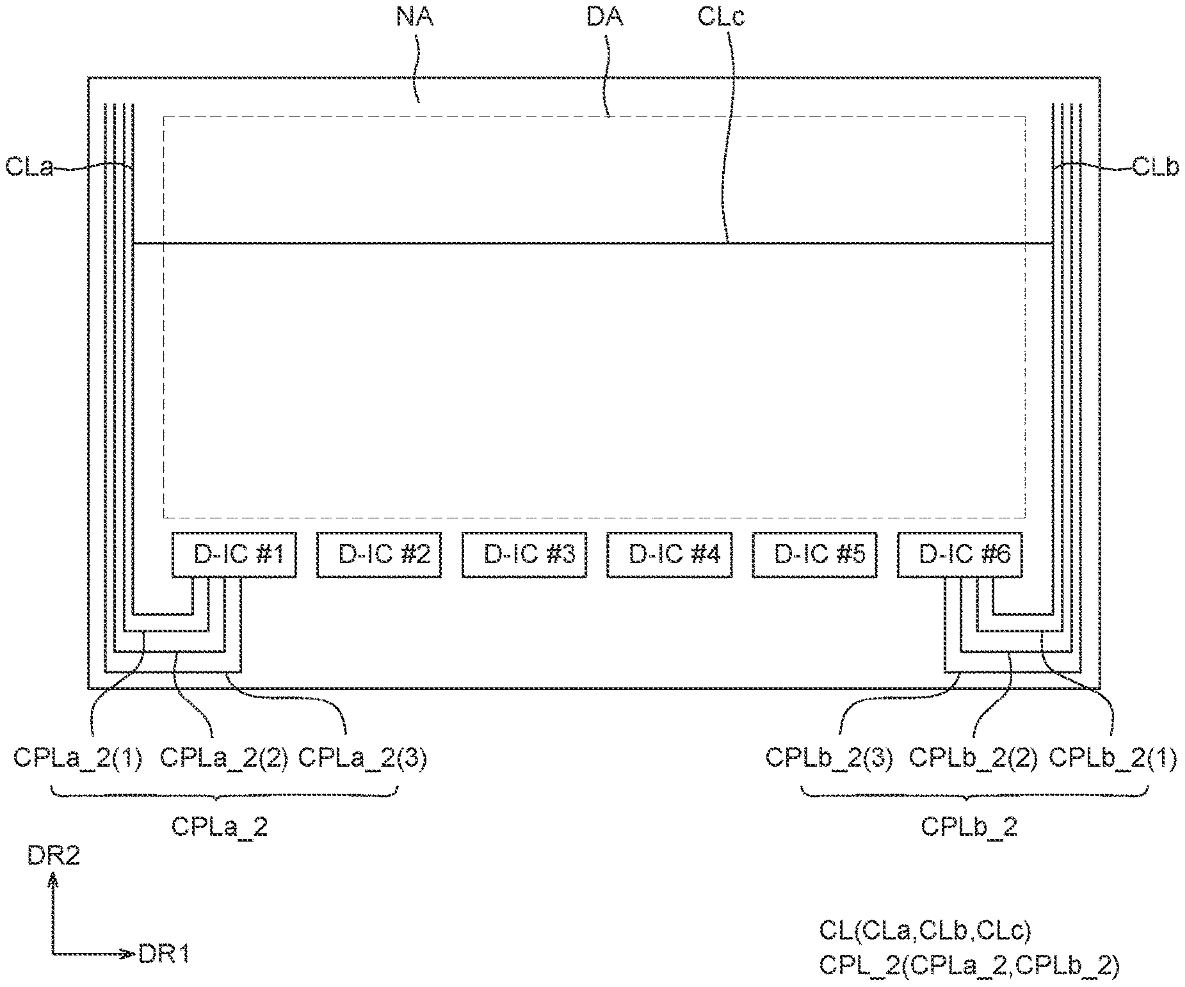

FIGS. 9A and 9B are views illustrating a clock line and a clock pseudo line disposed in a non-display area of a display device according to still another exemplary embodiment (fourth exemplary embodiment) of the present disclosure.

In the display device according to still another exemplary embodiment (fourth exemplary embodiment) of the present disclosure, a plurality of first clock pseudo lines CPLa_2 can be disposed at the outside of the first clock line CLa and a plurality of second clock pseudo lines CPLb_2 can be disposed at the outside of the second clock line CLb.

For example, three first clock pseudo lines CPLa_2 can be disposed at one side of the first clock line CLa in the first direction DR1. Three second clock pseudo lines CPLb_2 can be disposed at the other side of the second clock line CLb in the first direction DR1. However, the numbers of the first clock pseudo lines CPLa_2 and the second clock pseudo lines CPLb_2 are not limited thereto, for example, the number of each of the first clock pseudo lines CPLa_2 and the second clock pseudo lines CPLb_2 may be m, where m is integer greater or equal to 2.

The number of clock pseudo lines CPL_2 disposed in the non-display area NA can be equal to the number of source driving integrated circuits D-IC #1, . . . , D-IC #6 included in the display panel 100. However, the present disclosure is not limited thereto, the number of clock pseudo lines CPL_2 disposed in the non-display area NA may not be equal to the number of source driving integrated circuits D-IC #1, . . . , D-IC #6 included in the display panel 100.

As illustrated in FIG. 9A, the plurality of first clock pseudo lines CPLa_2 can be connected to different source driving integrated circuits D-IC #1, D-IC #2, and D-IC #3 and the plurality of second clock pseudo lines CPLb_2 can be connected to different source driving integrated circuits D-IC #4, D-IC #5, and D-IC #6.

For example, any one CPLa_2(1) among three first clock pseudo lines CPLa_2 can be connected to the first source driving integrated circuit D-IC #1 and another CPLa_2(2) among three first clock pseudo lines CPLa_2 can be connected to the second source driving integrated circuit D-IC #2. Further, the third CPLa_2(3) among three first clock pseudo lines CPLa_2 can be connected to the third source driving integrated circuit D-IC #3.

Therefore, each of three first clock pseudo lines CPLa_2 can be applied with the clock pseudo signal from each of the first to third source driving integrated circuits D-IC #1, D-IC #2, and D-IC #3.

Any one CPLb_2(1) among three second clock pseudo lines CPLb_2 can be connected to the sixth source driving integrated circuit D-IC #6 and another CPLb_2(2) among three second clock pseudo lines CPLb_2 can be connected to the fifth source driving integrated circuit D-IC #5. Further, the third CPLb_2(3) among three second clock pseudo lines CPLb_2 can be connected to the fourth source driving integrated circuit D-IC #4.

Therefore, each of three second clock pseudo lines CPLb_2 can be applied with the clock pseudo signal from each of the fourth to fifth source driving integrated circuits D-IC #4, D-IC #5, and D-IC #6.

That is, in FIG. 9A, different clock pseudo lines may be connected to different source driving integrated circuits.

In contrast, in some exemplary embodiments, as illustrated in FIG. 9B, each of the plurality of first clock pseudo lines CPLa_2 can be connected to any one source driving integrated circuit and each of the plurality of second clock pseudo lines CPLb_2 can be connected to the other source driving integrated circuit.

For example, three first clock pseudo lines CPLa_2(1), CPLa_2(2), and CPLa_2(3) are connected to the first source driving integrated circuit D-IC #1, respectively, to be applied with the clock pseudo signal from the first source driving integrated circuit D-IC #1. Alternatively, three first clock pseudo lines CPLa_2(1), CPLa_2(2), and CPLa_2(3) may be connected to the second source driving integrated circuit D-IC #2, respectively, to be applied with the clock pseudo signal from the second source driving integrated circuit D-IC #2, or three first clock pseudo lines CPLa_2(1), CPLa_2(2), and CPLa_2(3) may be connected to the third source driving integrated circuit D-IC #3, respectively, to be applied with the clock pseudo signal from the third source driving integrated circuit D-IC #3, but the present disclosure is not limited thereto.

Three second clock pseudo lines CPLb_2(1), CPLb_2(2), and CPLb_2(3) are connected to the sixth source driving integrated circuit D-IC #6, respectively, to be applied with the clock pseudo signal from the sixth source driving integrated circuit D-IC #6. Alternatively, three second clock pseudo lines CPLb_2(1), CPLb_2(2), and CPLb_2(3) may be connected to the fifth source driving integrated circuit D-IC #5, respectively, to be applied with the clock pseudo signal from the fifth source driving integrated circuit D-IC #5, or three second clock pseudo lines CPLb_2(1), CPLb_2(2), and CPLb_2(3) may be connected to the fourth source driving integrated circuit D-IC #4, respectively, to be applied with the clock pseudo signal from the fourth source driving integrated circuit D-IC #4, but the present disclosure is not limited thereto.

Referring to FIGS. 9A and 9B, the number of first clock pseudo lines CPLa_2 located at one side of the display panel 100 can be equal to the number of second clock pseudo lines CPLb_2 located at the other side of the display panel 100. However, the present disclosure is not limited thereto and the number of first clock pseudo lines CPLa_2 located at one side of the display panel 100 can be different from the number of second clock pseudo lines CPLb_2 located at the other side of the display panel 100. Meanwhile, the number of each of the first clock pseudo lines CPLa_2 and the second clock pseudo lines CPLb_2 is not limited to 3, for example, the number of the first clock pseudo lines CPLa_2 may be m, the number of second clock pseudo lines CPLb_2 may be p, where m and p are integers greater or equal to 1, respectively. The placement of the clock pseudo line CPL_2 can be appropriately changed in consideration of a design of a pixel and a circuit disposed on the display panel 100, such as the position of the gate driver GIP.

Figure 10:
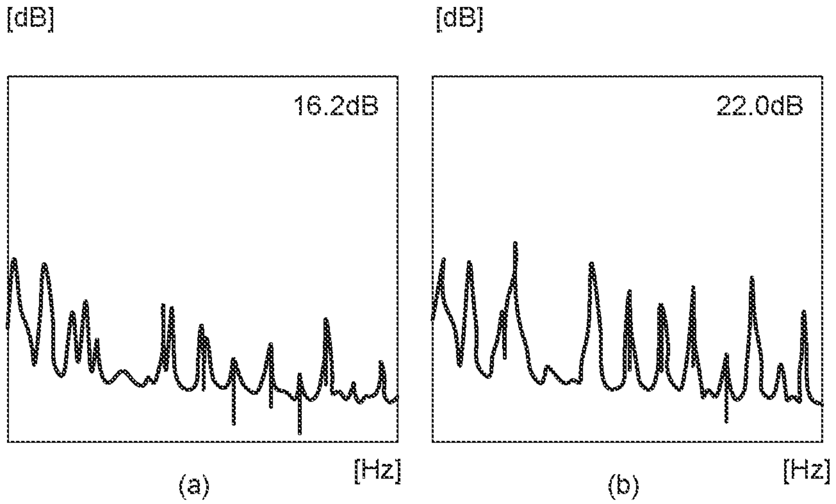
FIG. 10 shows a graph for explaining a radiation amount of a clock pseudo signal according to the number of clock pseudo lines.

FIG. 10 shows a graph for explaining a radiation amount of a clock pseudo signal according to the number of clock pseudo lines.

Specifically, a graph (a) of FIG. 10 illustrates a radiation amount of a clock pseudo signal when one first clock pseudo line CPLa_2 and one second clock pseudo line CPLb_2 are disposed. Specifically, the graph (b) of FIG. 10 illustrates a radiation amount of a clock pseudo signal when two first clock pseudo lines CPLa_2 and two second clock pseudo lines CPLb_2 are disposed. Here, X-axes of the graph (a) and the graph (b) of FIG. 10 refer to a frequency of the clock pseudo signal and Y-axes refer to a radiation amount.

The larger the number of first clock pseudo lines CPLa_2 and the number of second clock pseudo lines CPLb_2, the more the radiation amount of the clock pseudo signal.

For example, as illustrated in the graph (a) of FIG. 10, when one first clock pseudo line CPLa_2 and one second clock pseudo line CPLb_2 are disposed, a radiation amount of a clock pseudo signal is measured as 16.2 dB. For example, as illustrated in the graph (b) of FIG. 10, when two first clock pseudo lines CPLa_2 and two second clock pseudo lines CPLb_2 are disposed, a radiation amount of a clock pseudo signal is measured as 22.0 dB. For example, it is confirmed that as the number of first clock pseudo lines CPLa_2 and the number of second clock pseudo lines CPLb_2 are increased, the radiation amount of the clock pseudo signal is increased by approximately 5.6 dB.

FIG. 10 only illustrates examples that the radiation amounts of the clock pseudo signal are measured as 16.2 dB and 22.0 dB, but the radiation amount of the clock pseudo signal is not limited thereto, the measuring value of the radiation amount of the clock pseudo signal changes depending on the number of the clock pseudo lines.

In summary, the larger the number of the clock pseudo lines, the more the radiation amount of the clock pseudo signal applied to the clock pseudo line.

Therefore, a radiation amount of the clock signal applied to the clock line CL (for example, the first clock line CLa and the second clock line CLb) and a radiation amount of the clock pseudo signal applied to the clock pseudo line (for example, the first clock pseudo lines CPLa_2 and the second clock pseudo lines CPLb_2) may be the equal level.

Therefore, the electromagnetic wave of the clock signal may be effectively cancelled by the clock pseudo signal so that the electromagnetic interference may be effectively removed.

Figure 11:
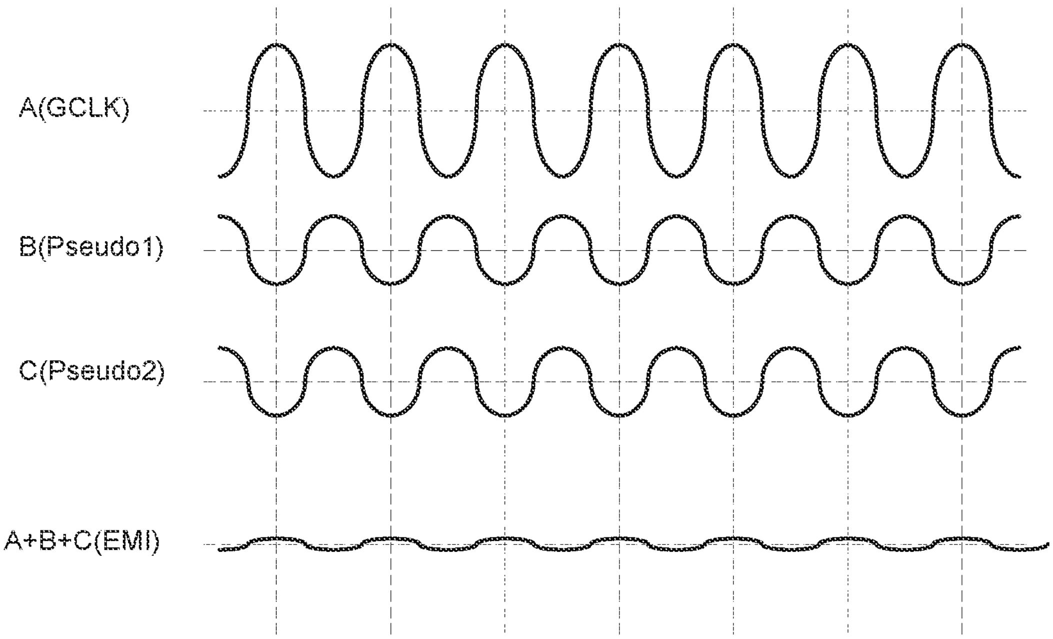
FIG. 11 shows a graph for explaining destructive interference of an electromagnetic interference generated in a display device according to still another exemplary embodiment of the present disclosure.

FIG. 11 shows a graph for explaining destructive interference of an electromagnetic interference generated in a display device according to still another exemplary embodiment (fourth exemplary embodiment) of the present disclosure.

A radiation amount of a clock pseudo signal applied to the plurality of first clock pseudo lines CPLa_2 and a radiation amount of a clock pseudo signal applied to the plurality of second clock pseudo lines CPLb_2 can be increased by increasing the number of first clock pseudo lines CPLa_2 and the number of second clock pseudo lines CPLb_2.

In other words, the number of first clock pseudo lines CPLa_2 and the number of second clock pseudo lines CPLb_2 can be adjusted and the radiation amount of a clock pseudo signal applied to the plurality of first clock pseudo lines CPLa_2 and a radiation amount of a clock pseudo signal applied to the plurality of second clock pseudo lines CPLb_2 can be adjusted.

As illustrated in FIG. 11, a radiation amount B(Pseudo1) of the clock pseudo signal applied to the plurality of first clock pseudo lines CPLa_2 and a radiation amount C(Pseudo2) of a clock pseudo signal applied to the plurality of second clock pseudo lines CPLb_2 can be increased by a half the radiation amount A(GCLK) of the clock signal.

In other words, a sum of the radiation amount B(Pseudo1) of the clock pseudo signal applied to the plurality of first clock pseudo lines CPLa_2 and the radiation amount C(Pseudo2) of the clock pseudo signal applied to the plurality of second clock pseudo lines CPLb_2 can be matched to be equal to the radiation amount A(GCLK) of the clock signal.

Therefore, the radiation amount A(GCLK) of the clock signal can be completely cancelled by the radiation amount B(Pseudo1) of the clock pseudo signal applied to the plurality of first clock pseudo lines CPLa_2 and the radiation amount C(Pseudo2) of the clock pseudo signal applied to the plurality of second clock pseudo lines CPLb_2.

For example, the electromagnetic wave of the clock signal can be completely cancelled by the clock pseudo signal applied to the plurality of first clock pseudo lines CPLa_2 and the plurality of second clock pseudo lines CPLb_2 so that the electromagnetic interference A+B+C(EMI) can be effectively removed.

Hereinafter, a display device according to still another exemplary embodiment (fifth exemplary embodiment) of the present disclosure will be described. The difference between the display device according to the exemplary embodiment of the present disclosure and a display device according to still another exemplary embodiment (fifth exemplary embodiment) of the present disclosure is a clock pseudo switch CPS connected to a clock pseudo line CPL, so that this will be described in detail.

For the convenience of description, the redundant description for the same component in the display device according to one exemplary embodiment of the present disclosure and the display device according to still another exemplary embodiment (fifth exemplary embodiment) of the present disclosure is omitted or briefly provided. Like reference numerals are used for like components.

Figure 12:
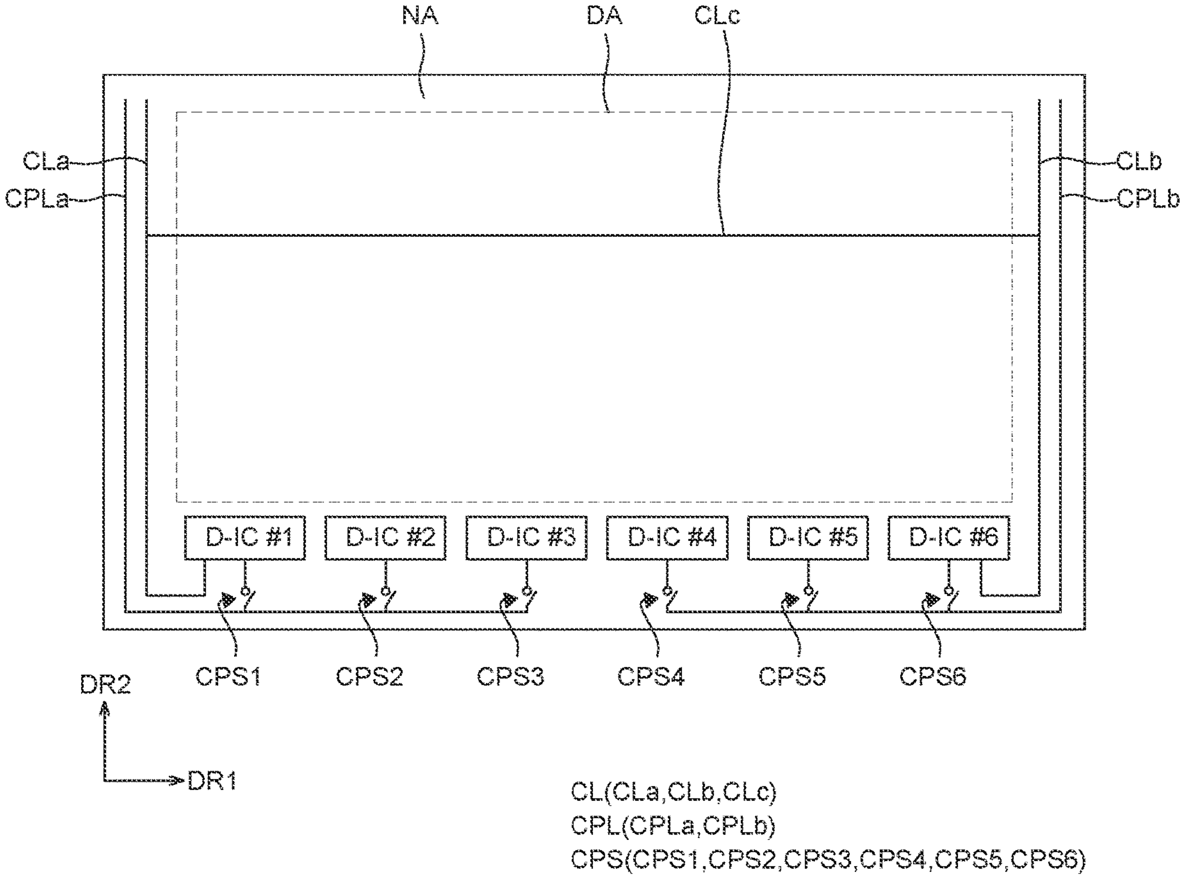
FIG. 12 is a view illustrating a clock line, a clock pseudo line, and a clock pseudo switch disposed in a non-display area of a display device according to still another exemplary embodiment of the present disclosure.

FIG. 12 is a view illustrating a clock line, a clock pseudo line, and a clock pseudo switch disposed in a non-display area of a display device according to still another exemplary embodiment (fifth exemplary embodiment) of the present disclosure.

The display device according to still another exemplary embodiment (fifth exemplary embodiment) of the present disclosure can include a plurality of clock pseudo switches CPS disposed between the clock pseudo line CPL and the plurality of source driving integrated circuits D-IC #1, . . . , D-IC #6 disposed in the non-display area NA.

The plurality of clock pseudo switches CPS can control an electrical connection state of the clock pseudo line CPL and the plurality of source driving integrated circuits D-IC #1, . . . , D-IC #6.

As illustrated in FIG. 12, the plurality of clock pseudo switches CPS can include a first clock pseudo switch CPS1 to a sixth clock pseudo switch CPS6.

Specifically, the first clock pseudo switch CPS1 is connected between the first clock pseudo line CPLa and the first source driving integrated circuit D-IC #1 to control a connection state of the first clock pseudo line CPLa and the first source driving integrated circuit D-IC #1.

The second clock pseudo switch CPS2 is connected between the first clock pseudo line CPLa and the second source driving integrated circuit D-IC #2 to control a connection state of the first clock pseudo line CPLa and the second source driving integrated circuit D-IC #2.

The third clock pseudo switch CPS3 is connected between the first clock pseudo line CPLa and the third source driving integrated circuit D-IC #3 to control a connection state of the first clock pseudo line CPLa and the third source driving integrated circuit D-IC #3.

Therefore, the number of source driving integrated circuits connected to the first clock pseudo line CPLa can be adjusted by the first clock pseudo switch CPS1 to third clock pseudo switch CPS3. For example, any one of the first clock pseudo switch CPS1, the second clock pseudo switch CPS2 and third clock pseudo switch CPS3 may be selectively and independently turned on.

The fourth clock pseudo switch CPS4 is connected between the second clock pseudo line CPLb and the fourth source driving integrated circuit D-IC #4 to control a connection state of the second clock pseudo line CPLb and the fourth source driving integrated circuit D-IC #4.

The fifth clock pseudo switch CPS5 is connected between the second clock pseudo line CPLb and the fifth source driving integrated circuit D-IC #5 to control a connection state of the second clock pseudo line CPLb and the fifth source driving integrated circuit D-IC #5.

The sixth clock pseudo switch CPS6 is connected between the second clock pseudo line CPLb and the sixth source driving integrated circuit D-IC #6 to control a connection state of the second clock pseudo line CPLb and the sixth source driving integrated circuit D-IC #6.

Therefore, the number of source driving integrated circuits connected to the second clock pseudo line CPLb can be adjusted by the fourth clock pseudo switch CPS4 to sixth clock pseudo switch CPS6. For example, any one of the fourth clock pseudo switch CPS4, the fifth clock pseudo switch CPS5 and the sixth clock pseudo switch CPS6 may be selectively and independently turned on.

Figure 13:
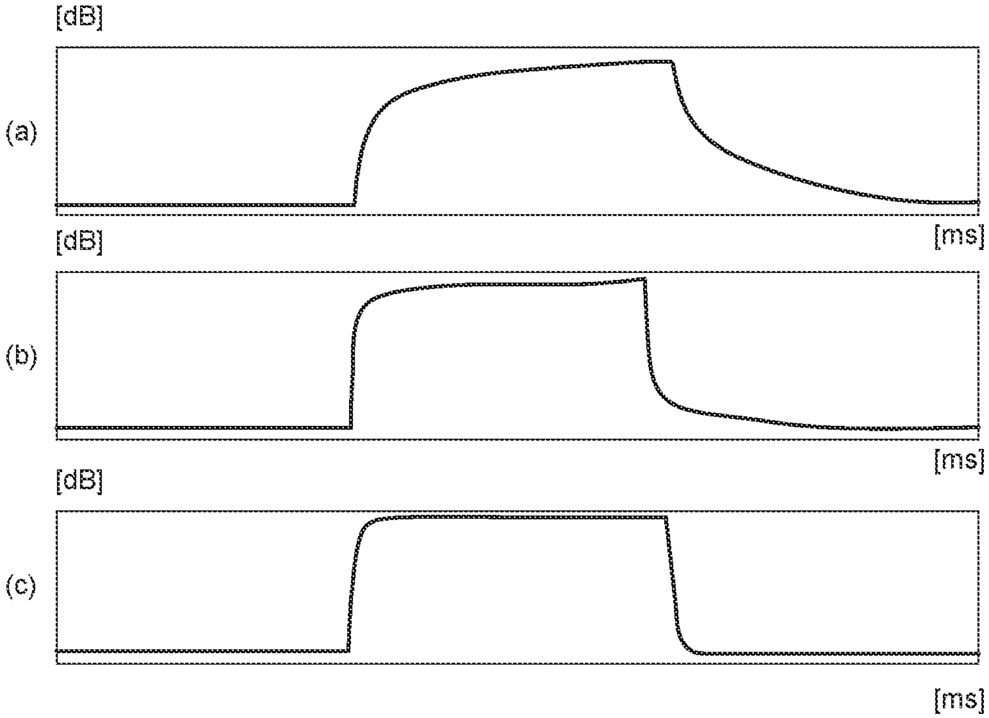
FIG. 13 shows a graph for explaining a radiation amount of a clock pseudo signal according to the number of source driving integrated circuits connected to a clock pseudo line.

FIG. 13 shows a graph for explaining a radiation amount of a clock pseudo signal according to the number of source driving integrated circuits connected to a clock pseudo line.

Specifically, a graph (a) of FIG. illustrates a radiation amount of a clock pseudo signal when one source driving integrated circuit is connected to each of a first clock pseudo line CPLa and a second clock pseudo line CPLb. Specifically, the graph (b) of FIG. 13 illustrates a radiation amount of a clock pseudo signal when two source driving integrated circuits are connected to each of a first clock pseudo line CPLa and a second clock pseudo line CPLb. Specifically, the graph (c) of FIG. 13 illustrates a radiation amount of a clock pseudo signal when three source driving integrated circuits are connected to each of a first clock pseudo line CPLa and a second clock pseudo line CPLb. Here, X-axes of the graph (a) to the graph (c) of FIG. 13 refer to a time and Y-axes refer to a radiation amount.

The larger the number of source driving integrated circuits which are connected to each of the first clock pseudo line CPLa and the second clock pseudo line CPLb, the more the radiation amount of the clock pseudo signal.

For example, when one of the first to third source driving integrated circuits D-IC #1, D-IC #2, and D-IC #3 is connected to the first clock pseudo line CPLa or one of the fourth to sixth source driving integrated circuits D-IC #4, D-IC #5, and D-IC #6 is connected to the second clock pseudo line CPLb, each of the first clock pseudo line CPLa and the second clock pseudo line CPLb can be applied with a clock pseudo signal from one source driving integrated circuit.

In this case, as illustrated in the graph (a) of FIG. 13, a gradient of the radiation amount graph of the clock pseudo signal can be the gentlest.

When two of the first to third source driving integrated circuits D-IC #1, D-IC #2, and D-IC #3 are connected to the first clock pseudo line CPLa or two of the fourth to sixth source driving integrated circuits D-IC #4, D-IC #5, and D-IC #6 are connected to the second clock pseudo line CPLb, each of the first clock pseudo line CPLa and the second clock pseudo line CPLb can be applied with a clock pseudo signal from two source driving integrated circuits.

In this case, as illustrated in the graph (b) of FIG. 13, a gradient of the radiation amount graph of the clock pseudo signal can be steeper than that in the graph (a) of FIG. 13.

When all the first to third source driving integrated circuits D-IC #1, D-IC #2, and D-IC #3 are connected to the first clock pseudo line CPLa or all the fourth to sixth source driving integrated circuits D-IC #4, D-IC #5, and D-IC #6 are connected to the second clock pseudo line CPLb, each of the first clock pseudo line CPLa and the second clock pseudo line CPLb can be applied with a clock pseudo signal from three source driving integrated circuits.

In this case, as illustrated in the graph (c) of FIG. 13, a gradient of the radiation amount graph of the clock pseudo signal can be steeper than that in the graph (b) of FIG. 13. For example, the gradient of the graph of the radiation amount of the clock pseudo signal can be the steepest. For example, when the gradient of the graph of the radiation amount of the clock pseudo signal is the steepest, it means that the radiation amount of the clock pseudo signal is the highest.

As a result, the display device according to still another exemplary embodiment of the present disclosure can adjust a radiation amount of the clock pseudo signal by controlling the number of source driving integrated circuits connected to the clock pseudo line CPL by the plurality of clock pseudo switches CPS.

By doing this, the radiation amount of the clock pseudo signal can be adjusted in accordance with a radiation amount of an electromagnetic wave of the clock signal by the plurality of clock pseudo switches CPS.

Accordingly, the display device according to still another (fifth exemplary embodiment) of the present disclosure can match the radiation amount of the electromagnetic wave of the clock signal and the radiation amount of the clock pseudo signal to effectively remove the electromagnetic interference.

Hereinafter, a display device according to still another exemplary embodiment of the present disclosure will be described.

For the convenience of description, the redundant description for the same component in the display device according to the exemplary embodiment of the present disclosure and the display device according to another exemplary embodiment of the present disclosure is omitted or briefly provided. Like reference numerals are used for like components.

Figure 14:
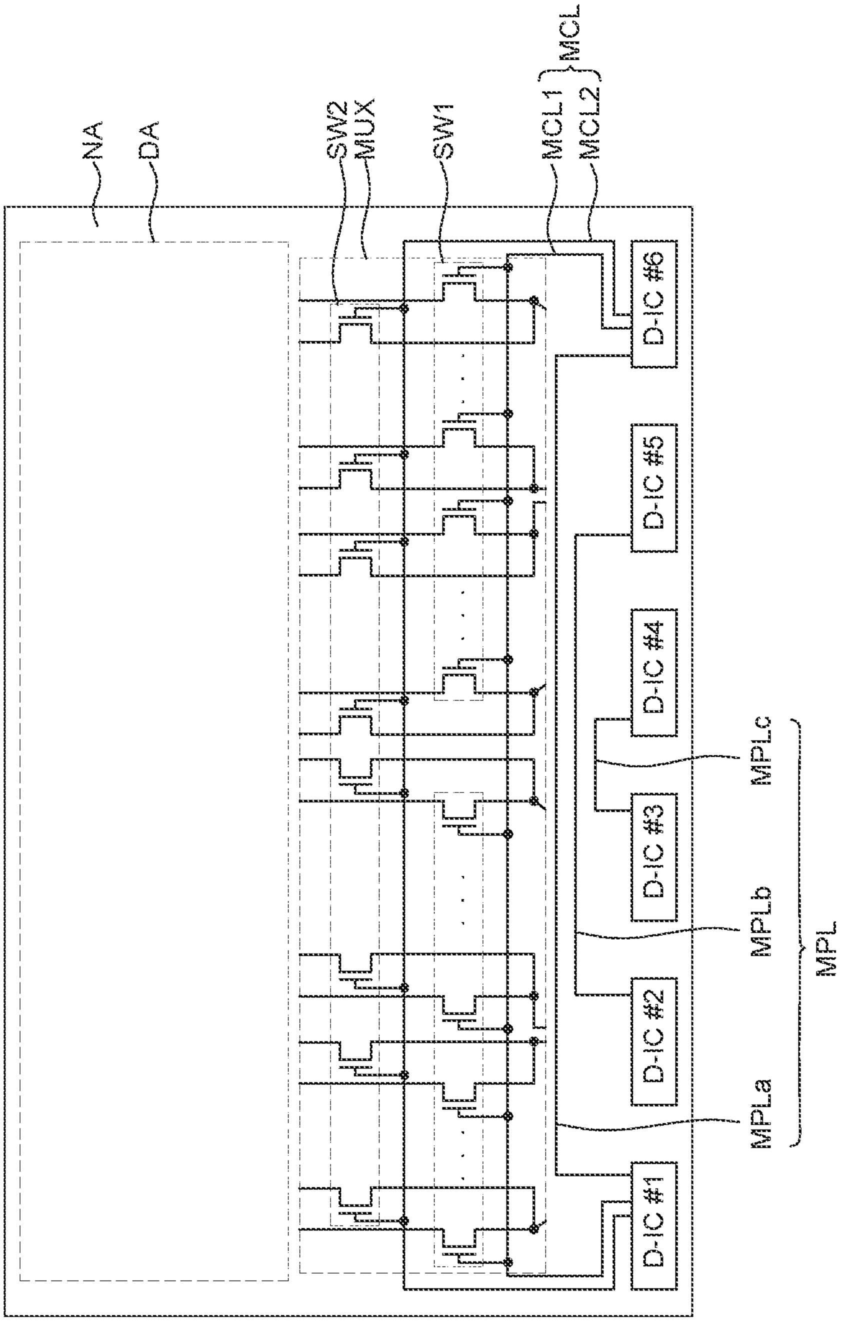
FIG. 14 is a view illustrating a multiplexer and a MUX pseudo line disposed in a non-display area of a display device according to still another exemplary embodiment of the present disclosure.

FIG. 14 is a view illustrating a multiplexer and a MUX pseudo line disposed in a non-display area of a display device according to still another exemplary embodiment (sixth exemplary embodiment) of the present disclosure.

Referring to FIG. 14, in the non-display area NA of the display panel, a plurality of source driving integrated circuits D-IC #1, . . . , D-IC #6, a multiplexer MUX, a MUX (multiplexer) control signal line MCL, and a MUX pseudo line MPL can be disposed.

The plurality of source driving integrated circuits D-IC #1, . . . , D-IC #6 can supply a data voltage to the link lines. The plurality of source driving integrated circuits D-IC #1, . . . , D-IC #6 and the multiplexer MUX are connected through a link line to supply a data voltage to the multiplexer MUX.

The multiplexer MUX includes a plurality of first switching elements SW1 and a plurality of second switching element SW2. Each of the plurality of first switching elements SW1 connects the link line and any one of the plurality of data lines in accordance with a first control signal applied to a first MUX control line MCL1. Each of the plurality of second switching elements SW2 connects the link line and the other one of the plurality of data lines in accordance with a second control signal applied to a second MUX control line MCL2.

Specifically, the first switching element SW1 includes a gate electrode connected to the first MUX control line MCL1, a drain electrode connected to the link line, and a source electrode connected to any one of the plurality of data lines.

When a first MUX control signal applied to the first MUX control line MCL1 is a high level, the first switching element SW1 is turned on so that the link line is electrically connected to any one of the plurality of data lines. In contrast, when the first MUX control signal applied to the first MUX control line MCL1 is a low level, the first switching element SW1 is turned off so that the link line is electrically isolated from any one of the plurality of data lines.

The second switching element SW2 includes a gate electrode connected to the second MUX control line MCL2, a drain electrode connected to the link line, and a source electrode connected to the other one of the plurality of data lines.

Therefore, when a second MUX control signal applied to the second MUX control line MCL2 is a high level, the second switching element SW2 is turned on so that the link line is electrically connected to the other one of the plurality of data lines. In contrast, when the second MUX control signal applied to the second MUX control line MCL2 is a low level, the second switching element SW2 is turned off so that the link line is electrically isolated from the other one of the plurality of data lines.

The plurality of source driving integrated circuits D-IC #1, . . . , D-IC #6 can supply the first MUX control signal and the second MUX control signal to the first MUX control line MCL1 and the second MUX control line MCL2 described above, respectively. The plurality of source driving integrated circuits D-IC #1, . . . , D-IC #6 can supply a MUX pseudo signal to the MUX pseudo line MPL. A phase of the above-described MUX pseudo signal can be inverted from a phase of the first MUX control signal. Alternately, a phase of the MUX pseudo signal can be inverted from a phase of the second MUX control signal. For example, the phase of the MUX pseudo signal can be inverted from the phases of the plurality of MUX control signals. The above-described MUX pseudo signal can be referred to as an inverted MUX control signal.

Referring to FIG. 14, the first MUX control line MCL1 to which the first MUX control signal is applied and the second MUX control line MCL2 to which the second MUX control signal is applied are connected to source driving integrated circuits D-IC #1 and D-IC #6 disposed at the outermost sides among the plurality of source driving integrated circuits D-IC #1, . . . , D-IC #6 to configure a loop.

Specifically, the first MUX control line MCL1 is connected to the first source driving integrated circuit D-IC #1 and the sixth source driving integrated circuit D-IC #6 to be applied with the first MUX control signal from the first source driving integrated circuit D-IC #1 and the sixth source driving integrated circuit D-IC #6. The second MUX control line MCL2 is also connected to the first source driving integrated circuit D-IC #1 and the sixth source driving integrated circuit D-IC #6 to be applied with the first MUX control signal.

In the meantime, the MUX pseudo line MPL can include a first MUX pseudo line MPLa, a second MUX pseudo line MPLb, and a third MUX pseudo line MPLc which are disposed to be adjacent to the first MUX control line MCL1 and the second MUX control line MCL2.

The first MUX pseudo line MPLa, the second MUX pseudo line MPLb, and the third MUX pseudo line MPLc can be connected to at least one of the plurality of source driving integrated circuits D-IC #1, . . . , D-IC #6.

Specifically, the first MUX pseudo line MPLa is connected to the first source driving integrated circuit D-IC #1 and the sixth source driving integrated circuit D-IC #6 to be applied with the MUX pseudo signal with a phase inverted from that of the first MUX control signal or the second MUX control signal from the first source driving integrated circuit D-IC #1 and the sixth source driving integrated circuit D-IC #6.

The second MUX pseudo line MPLb is connected to the second source driving integrated circuit D-IC #2 and the fifth source driving integrated circuit D-IC #5 to be applied with the MUX pseudo signal with a phase inverted from that of the first MUX control signal or the second MUX control signal from the second source driving integrated circuit D-IC #2 and the fifth source driving integrated circuit D-IC #5.

The third MUX pseudo line MPLc is connected to the third source driving integrated circuit D-IC #3 and the fourth source driving integrated circuit D-IC #4 to be applied with the MUX pseudo signal with a phase inverted from that of the first MUX control signal or the second MUX control signal from the third source driving integrated circuit D-IC #3 and the fourth source driving integrated circuit D-IC #4.

As illustrated in FIG. 14, the first MUX pseudo line MPLa to the third MUX pseudo line MPLc can have a straight line shape. However, the present disclosure is not limited thereto and the first MUX pseudo line MPLa to the third MUX pseudo line MPLc can have a wavy shape. For example, the first MUX pseudo line MPLa to the third MUX pseudo line MPLc can have a square wave shape or a sine wave shape. Alternatively, the first MUX pseudo line MPLa to the third MUX pseudo line MPLc may have a Zigzag wave shape. Therefore, the entire length of each of the first MUX pseudo line MPLa to the third MUX pseudo line MPLc can be increased.

As described above, in the display device according to still another exemplary embodiment (sixth exemplary embodiment) of the present disclosure, the MUX pseudo line MPL is disposed to be adjacent to the plurality of MUX control signal lines MCL. Further, a MUX pseudo signal with a phase inverted from that of the MUX control signal can be applied to the MUX pseudo line MPL.

Therefore, the electromagnetic wave which is generated by the MUX control signal in the plurality of MUX control signal lines MCL can be cancelled by the MUX pseudo signal.

As a result, in the display device according to still another exemplary embodiment (sixth exemplary embodiment) of the present disclosure, the interference due to the electromagnetic wave of the MUX control signal can be significantly reduced so that the erroneous operation of the display device can be suppressed.

Hereinafter, a display device according to still another exemplary embodiment (seventh exemplary embodiment) of the present disclosure will be described. The difference between the display device according to the exemplary embodiment of the present disclosure and a display device according to still another exemplary embodiment (seventh exemplary embodiment) of the present disclosure is a MUX pseudo switch MPS connected to a MUX pseudo line MPL, so that this will be described in detail.

For the convenience of description, the redundant description for the same component in the display device according to one exemplary embodiment of the present disclosure and the display device according to still another exemplary embodiment (seventh exemplary embodiment) of the present disclosure is omitted or briefly provided. Like reference numerals are used for like components.

Figure 15:
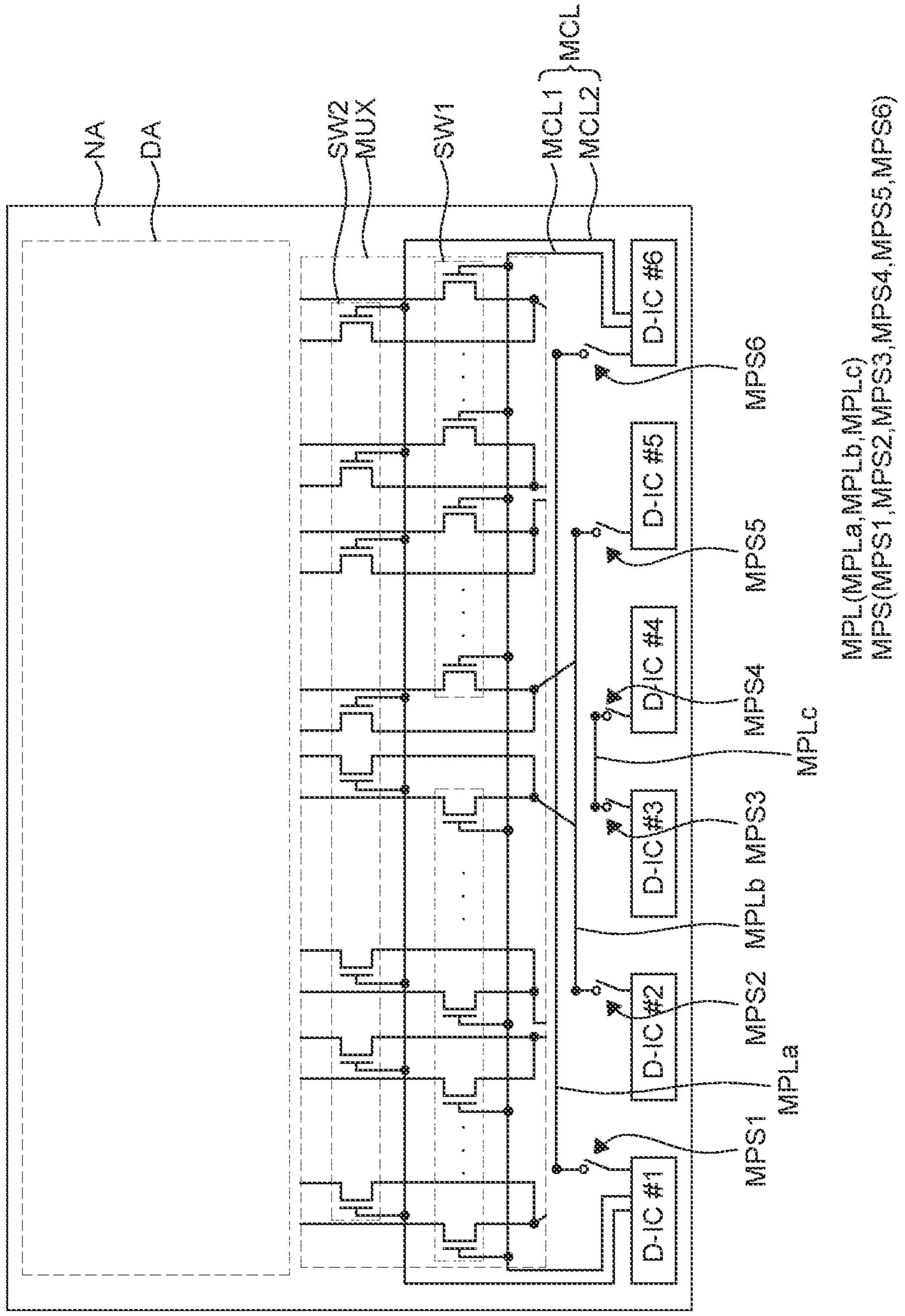
FIG. 15 is a view illustrating a MUX control line, a MUX pseudo line, and a MUX pseudo switch disposed in a non-display area of a display device according to still another exemplary embodiment of the present disclosure.

FIG. 15 is a view illustrating a MUX control line, a MUX pseudo line, and a MUX pseudo switch disposed in a non-display area of a display device according to still another exemplary embodiment (seventh exemplary embodiment) of the present disclosure.

The display device according to still another exemplary embodiment (seventh exemplary embodiment) of the present disclosure can further include a plurality of MUX pseudo switches MPS disposed between a plurality of MUX pseudo lines MPL and the plurality of source driving integrated circuits D-IC #1, . . . , D-IC #6 disposed in the non-display area NA.

The plurality of MUX pseudo switches MPS can control an electrical connection state of the plurality of MUX pseudo lines MPL and the plurality of source driving integrated circuits D-IC #1, . . . , D-IC #6.

As illustrated in FIG. 15, the plurality of MUX pseudo switches MPS can include a first MUX pseudo switch MPS1 to a sixth MUX pseudo switch MPS6.

Specifically, the first MUX pseudo switch MPS1 is connected between the first MUX pseudo line MPLa and the first source driving integrated circuit D-IC #1 to control a connection state of the first MUX pseudo line MPLa and the first source driving integrated circuit D-IC #1.

The second MUX pseudo switch MPS2 is connected between the second MUX pseudo line MPLb and the second source driving integrated circuit D-IC #2 to control a connection state of the second MUX pseudo line MPLb and the second source driving integrated circuit D-IC #2.

The third MUX pseudo switch MPS3 is connected between the third MUX pseudo line MPLc and the third source driving integrated circuit D-IC #3 to control a connection state of the third MUX pseudo line MPLc and the third source driving integrated circuit D-IC #3.

The fourth MUX pseudo switch MPS4 is connected between the third MUX pseudo line MPLc and the fourth source driving integrated circuit D-IC #4 to control a connection state of the third MUX pseudo line MPLc and the fourth source driving integrated circuit D-IC #4.

The fifth MUX pseudo switch MPS5 is connected between the second MUX pseudo line MPLb and the fifth source driving integrated circuit D-IC #5 to control a connection state of the second MUX pseudo line MPLb and the fifth source driving integrated circuit D-IC #5.

The sixth MUX pseudo switch MPS6 is connected between the first MUX pseudo line MPLa and the sixth source driving integrated circuit D-IC #6 to control a connection state of the first MUX pseudo line MPLa and the sixth source driving integrated circuit D-IC #6.

Therefore, the number of source driving integrated circuits connected to the first MUX pseudo line MPLa can be adjusted by the first MUX pseudo switch MPS1 and the sixth MUX pseudo switch MPS6. Therefore, the number of source driving integrated circuits connected to the second MUX pseudo line MPLb can be adjusted by the second MUX pseudo switch MPS2 and the fifth MUX pseudo switch MPS5. The number of source driving integrated circuits connected to the third MUX pseudo line MPLc can be adjusted by the third MUX pseudo switch MPS3 and the fourth MUX pseudo switch MPS4.

For example, any one of the first MUX pseudo switch MPS1, the second MUX pseudo switch MPS2, the third MUX pseudo switch MPS3, the fourth MUX pseudo switch MPS4, the fifth MUX pseudo switch MPS5 and the sixth MUX pseudo switch MPS6 may be selectively and independently turned on.

As described above with reference to FIG. 13, the larger the number of source driving integrated circuits connected to the clock pseudo line CPL, the more the radiation amount of the clock pseudo signal.

With the same technical logic, the larger the number of source driving integrated circuits connected to the plurality of MUX pseudo lines MPL, the more the radiation amount of the MUX pseudo signal.

Therefore, also in the display device according to still another exemplary embodiment (seventh exemplary embodiment) of the present disclosure, the radiation amount of the inverted MUX signal can be adjusted by the plurality of MUX pseudo switches MPS.

By doing this, the radiation amount of the MUX pseudo signal can be adjusted by the plurality of MUX pseudo switches MPS, in accordance with the radiation amount of the electromagnetic wave of the MUX control signal.

Accordingly, the display device according to still another (seventh exemplary embodiment) of the present disclosure can match the radiation amount of the electromagnetic wave of the MUX control signal and the radiation amount of the MUX pseudo signal to effectively remove the electromagnetic interference.

Hereinafter, a display device according to still another exemplary embodiment (eighth exemplary embodiment) of the present disclosure will be described.

For the convenience of description, the redundant description for the same component in the display device according to the exemplary embodiment of the present disclosure and the display device according to another exemplary embodiment of the present disclosure is omitted or briefly provided. Like reference numerals are used for like components.

Figure 16:
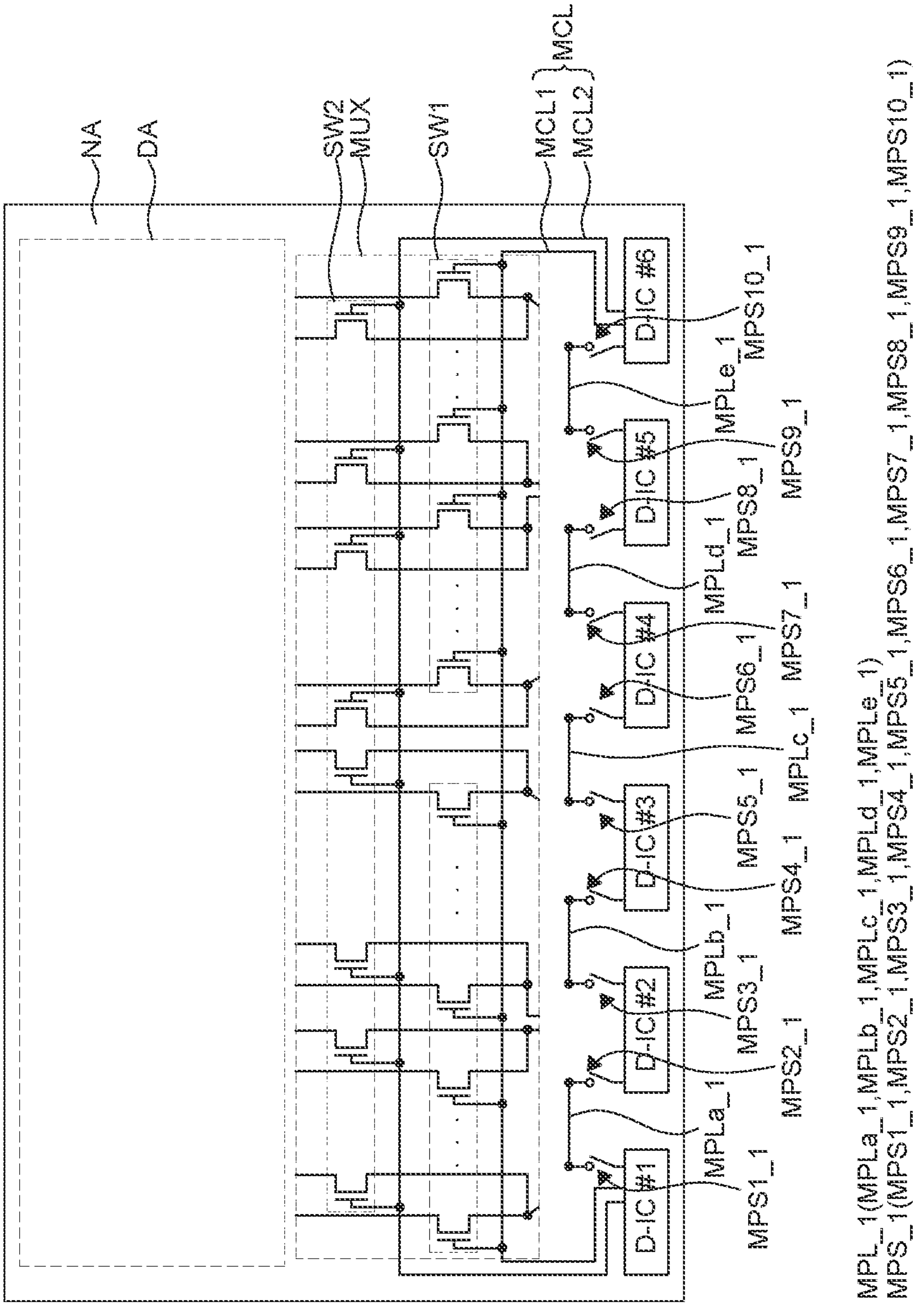
FIG. 16 is a view illustrating a MUX control line, a MUX pseudo line, and a MUX pseudo switch disposed in a non-display area of a display device according to still another exemplary embodiment of the present disclosure.

FIG. 16 is a view illustrating a MUX control line, a MUX pseudo line, and a MUX pseudo switch disposed in a non-display area of a display device according to still another exemplary embodiment (eighth exemplary embodiment) of the present disclosure.

In the display device according to still another exemplary embodiment (eighth exemplary embodiment) of the present disclosure, a MUX pseudo line MPL_1 can include first to fifth MUX pseudo lines MPLa_1, MPLb_1, MPLc_1, MPLd_1, and MPLe_1 disposed to be adjacent to the first MUX control line MCL1 and the second MUX control line MCL2.

Each of the first to fifth MUX pseudo lines MPLa_1, MPLb_1, MPLc_1, MPLd_1, and MPLe_1 can be electrically connected to at least one of the plurality of source driving integrated circuits D-IC #1, . . . , D-IC #6 through a plurality of MUX pseudo switches MPS_1.

For example, the plurality of MUX pseudo switches MPS_1 can control a connection state of the first to fifth MUX pseudo lines MPLa_1, MPLb_1, MPLc_1, MPLd_1, and MPLe_1 and the plurality of source driving integrated circuits D-IC #1, . . . , D-IC #6.

As illustrated in FIG. 16, the plurality of MUX pseudo switches MPS_1 can include a first MUX pseudo switch MPS1_1 to a tenth MUX pseudo switch MPS10_1.

Specifically, the first MUX pseudo switch MPS1_1 is connected between the first MUX pseudo line MPLa_1 and the first source driving integrated circuit D-IC #1 to control a connection state of the first MUX pseudo line MPLa_1 and the first source driving integrated circuit D-IC #1.

A second MUX pseudo switch MPS2_1 is connected between the first MUX pseudo line MPLa_1 and the second source driving integrated circuit D-IC #2 to control a connection state of the first MUX pseudo line MPLa_1 and the second source driving integrated circuit D-IC #2.

A third MUX pseudo switch MPS3_1 is connected between the second MUX pseudo line MPLb_1 and the second source driving integrated circuit D-IC #2 to control a connection state of the second MUX pseudo line MPLb_1 and the second source driving integrated circuit D-IC #2.

A fourth MUX pseudo switch MPS4_1 is connected between the second MUX pseudo line MPLb_1 and the third source driving integrated circuit D-IC #3 to control a connection state of the second MUX pseudo line MPLb_1 and the third source driving integrated circuit D-IC #3.

A fifth MUX pseudo switch MPS5_1 is connected between the third MUX pseudo line MPLc_1 and the third source driving integrated circuit D-IC #3 to control a connection state of the third MUX pseudo line MPLc_1 and the third source driving integrated circuit D-IC #3.

A sixth MUX pseudo switch MPS6_1 is connected between the third MUX pseudo line MPLc_1 and the fourth source driving integrated circuit D-IC #4 to control a connection state of the third MUX pseudo line MPLc_1 and the fourth source driving integrated circuit D-IC #4.

A seventh MUX pseudo switch MPS7_1 is connected between the fourth MUX pseudo line MPLd_1 and the fourth source driving integrated circuit D-IC #4 to control a connection state of the fourth MUX pseudo line MPLd_1 and the fourth source driving integrated circuit D-IC #4.

An eighth MUX pseudo switch MPS8_1 is connected between the fourth MUX pseudo line MPLd_1 and the fifth source driving integrated circuit D-IC #5 to control a connection state of the fourth MUX pseudo line MPLd_1 and the fifth source driving integrated circuit D-IC #5.

A ninth MUX pseudo switch MPS9_1 is connected between the fifth MUX pseudo line MPLe_1 and the fifth source driving integrated circuit D-IC #5 to control a connection state of the fifth MUX pseudo line MPLe_1 and the fifth source driving integrated circuit D-IC #5.

A tenth MUX pseudo switch MPS10_1 is connected between the fifth MUX pseudo line MPLe_1 and the sixth source driving integrated circuit D-IC #6 to control a connection state of the fifth MUX pseudo line MPLe_1 and the sixth source driving integrated circuit D-IC #6.

Therefore, the first MUX pseudo line MPLa_1 is connected to at least one of the first source driving integrated circuit D-IC #1 and the second source driving integrated circuit D-IC #2 to be applied with the MUX pseudo signal with a phase inverted from that of the first MUX control signal or the second MUX control signal from at least one of the first source driving integrated circuit D-IC #1 and the second source driving integrated circuit D-IC #2.

The second MUX pseudo line MPLb_1 is connected to at least one of the second source driving integrated circuit D-IC #2 and the third source driving integrated circuit D-IC #3 to be applied with the MUX pseudo signal with a phase inverted from that of the first MUX control signal or the second MUX control signal from at least one of the second source driving integrated circuit D-IC #2 and the third source driving integrated circuit D-IC #3.

The third MUX pseudo line MPLc_1 is connected to at least one of the third source driving integrated circuit D-IC #3 and the fourth source driving integrated circuit D-IC #4 to be applied with the MUX pseudo signal with a phase inverted from that of the first MUX control signal or the second MUX control signal from at least one of the third source driving integrated circuit D-IC #3 and the fourth source driving integrated circuit D-IC #4.

The fourth MUX pseudo line MPLd_1 is connected to at least one of the fourth source driving integrated circuit D-IC #4 and the fifth source driving integrated circuit D-IC #5 to be applied with the MUX pseudo signal with a phase inverted from that of the first MUX control signal or the second MUX control signal from at least one of the fourth source driving integrated circuit D-IC #4 and the fifth source driving integrated circuit D-IC #5.

The fifth MUX pseudo line MPLe_1 is connected to at least one of the fifth source driving integrated circuit D-IC #5 and the sixth source driving integrated circuit D-IC #6 to be applied with the MUX pseudo signal with a phase inverted from that of the first MUX control signal or the second MUX control signal from at least one of the fifth source driving integrated circuit D-IC #5 and the sixth source driving integrated circuit D-IC #6.

As illustrated in FIG. 16, the first MUX pseudo line MPLa_1 to the fifth MUX pseudo line MPLe_1 each can have a straight line shape. However, the present disclosure is not limited thereto and the first MUX pseudo line MPLa_1 to the fifth MUX pseudo line MPLe_1 each can have a wavy shape. For example, the first MUX pseudo line MPLa_1 to the fifth MUX pseudo line MPLe_1 can have a square wave shape or a sine wave shape.

Alternatively, the first MUX pseudo line MPLa_1 to the fifth MUX pseudo line MPLe_1 may have a Zigzag wave shape.

In other words, the number of source driving integrated circuits connected to the first to fifth MUX pseudo lines MPLa_1, MPLb_1, MPLc_1, MPLd_1, and MPLe_1 can be adjusted by the first MUX pseudo switch MPS1_1 and the tenth MUX pseudo switch MPS10_1.

As described above with reference to FIG. 13, the larger the number of source driving integrated circuits connected to the clock pseudo line CPL, the more the radiation amount of the clock pseudo signal.

With the same technical logic, the larger the number of source driving integrated circuits connected to the plurality of MUX pseudo lines MPL_1, the more the radiation amount of the MUX pseudo signal.

Therefore, also in the display device according to still another exemplary embodiment (eighth exemplary embodiment) of the present disclosure, the radiation amount of the inverted MUX signal can be adjusted by the plurality of MUX pseudo switches MPS_1.

By doing this, the radiation amount of the MUX pseudo signal can be adjusted in accordance with the radiation amount of the electromagnetic wave of the MUX control signal by controlling the plurality of MUX pseudo switches MPS_1.

Accordingly, the display device according to still another (eighth exemplary embodiment) of the present disclosure can match the radiation amount of the electromagnetic wave of the MUX control signal and the radiation amount of the MUX pseudo signal to effectively remove the electromagnetic interference.

The exemplary embodiments of the present disclosure can also be described as follows:

According to an aspect of the present disclosure, a display device includes a display panel which includes a display area in which a plurality of pixels is disposed and a non-display area except the display area; a gate driver which is disposed in the non-display area of the display panel and is configured to supply a gate signal to the plurality of pixels; a data driver which is configured to supply a data voltage to the plurality of pixels and is configured to supply a clock signal to the gate driver through a clock line; and a clock pseudo line which is disposed in the non-display area of the display panel and is applied with a clock pseudo signal with a phase inverted from a phase of the clock signal. By this configuration, the electromagnetic interference by the clock signal can be effectively removed or minimized.

The data driver can include a plurality of source driving integrated circuits disposed in a first direction, the clock line can include a first clock line and a second clock line which are disposed on both sides of the first direction and extend in a second direction, and each of the first clock line and the second clock line can be connected to source driving integrated circuits disposed at the outermost sides, among the plurality of source driving integrated circuits.

The clock line can further include a third clock line which extends in the second direction and connects the first clock line and the second clock line.

The clock pseudo line can include a first clock pseudo line and a second clock pseudo line disposed at outsides of the first clock line and the second clock line.

Each of the first clock pseudo line and the second clock pseudo line can be connected to source driving integrated circuits disposed between source driving integrated circuits connected to the clock line, among the plurality of source driving integrated circuits.

The clock pseudo line can have a wavy shape.

At least one clock pseudo switch can be disposed between the clock pseudo line and each of the plurality of source driving integrated circuits.

The clock pseudo line further can include a third clock pseudo line which extends in the first direction and connects the first clock pseudo line and the second clock pseudo line.

A width of the clock pseudo line can be larger than a width of the clock line.

A plurality of first clock pseudo lines can be provided and a plurality of second clock pseudo lines is provided.

Each of the plurality of first clock pseudo lines can be connected to a different source driving integrated circuit and each of the plurality of second clock pseudo lines can be connected to a different source driving integrated circuit.

All the plurality of first clock pseudo lines can be connected to any one of source driving integrated circuits and all the plurality of second clock pseudo lines can be connected to the other one of the source driving integrated circuits.

The display device can further comprise a multiplexer which is connected to the plurality of source driving integrated circuits and is controlled by a multiplexer (MUX) control signal applied through a MUX control line to supply the data voltage to the plurality of pixels; and a MUX pseudo line which is disposed in the non-display area of the display panel and is applied with a MUX pseudo signal with a phase inverted from that of the MUX control signal from the plurality of source driving integrated circuits.

At least one MUX pseudo switch can be disposed between the MUX pseudo line and each of the plurality of source driving integrated circuits.

The MUX pseudo line can include a plurality of MUX pseudo lines and each of the plurality of MUX pseudo lines is connected to at least one of the plurality of source driving integrated circuits through the at least one MUX pseudo switches.

A length of the clock pseudo line is same to a length of the clock line.

A radiation amount of the clock signal is equal to a radiation amount of the clock pseudo signal.

The first clock pseudo line and one of the plurality of first clock pseudo lines are connected to a same source driving integrated circuit, and the second clock pseudo line and one of the plurality of second clock pseudo lines are connected to a same source driving integrated circuit.

The first clock pseudo line and all the plurality of first clock pseudo lines are connected to a same source driving integrated circuit, and the second clock pseudo line and all the plurality of second clock pseudo lines are connected to a same source driving integrated circuit.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto.

Therefore, it should be understood that the above-described exemplary embodiments are illustrative in all aspects and do not limit the present disclosure. All the technical concepts in the equivalent scope of the present disclosure should be construed as falling within the scope of the present disclosure.

What is claimed is:

1. A display device, comprising:

a display panel including a display area and a non-display area adjacent to the display area, the display area including a plurality of pixels;

a timing controller configured to generate a gate control signal;

a gate driver disposed in the non-display area of the display panel, the gate driver configured to supply a gate signal to the plurality of pixels based on the gate control signal;

a data driver configured to supply a data voltage to the plurality of pixels, and supply a clock signal to the gate driver through a clock line; and a clock pseudo line disposed in the non-display area of the display panel, the clock pseudo line applied with a clock pseudo signal with a phase inverted from a phase of the clock signal, wherein the clock line has a first end connected to the data driver and a second end connected to the gate driver, wherein the clock pseudo line does not electrically connect the data driver to the gate driver, and wherein the clock pseudo line does not electrically connect the data driver to the timing controller.

2. The display device according to claim 1, wherein the data driver includes a plurality of source driving integrated circuits disposed in a first direction, the clock line includes a first clock line and a second clock line disposed on both sides of the first direction and extending in a second direction, and each of the first clock line and the second clock line is connected to source driving integrated circuits disposed at outermost sides, among the plurality of source driving integrated circuits.

3. The display device according to claim 2, wherein the clock line further includes a third clock line extending in the second direction and connecting the first clock line and the second clock line.

4. The display device according to claim 2, wherein the clock pseudo line includes a first clock pseudo line and a second clock pseudo line disposed at outsides of the first clock line and the second clock line.

5. The display device according to claim 4, wherein each of the first clock pseudo line and the second clock pseudo line is connected to source driving integrated circuits disposed between source driving integrated circuits connected to the clock line, among the plurality of source driving integrated circuits.

6. The display device according to claim 4, wherein at least one clock pseudo switch is disposed between the clock pseudo line and each of the plurality of source driving integrated circuits.

7. The display device according to claim 4, wherein the clock pseudo line further includes a third clock pseudo line extending in the first direction and connecting the first clock pseudo line and the second clock pseudo line.

8. The display device according to claim 4, wherein a plurality of first clock pseudo lines are provided and a plurality of second clock pseudo lines are provided.

9. The display device according to claim 8, wherein each of the plurality of first clock pseudo lines is connected to a different source driving integrated circuit, and each of the plurality of second clock pseudo lines is connected to a different source driving integrated circuit.

10. The display device according to claim 8, wherein all the plurality of first clock pseudo lines are connected to any one of the source driving integrated circuits, and all the plurality of second clock pseudo lines are connected to another of the source driving integrated circuits.

11. The display device according to claim 8, wherein the first clock pseudo line and one of the plurality of first clock pseudo lines are connected to a same source driving integrated circuit, and the second clock pseudo line and one of the plurality of second clock pseudo lines are connected to a same source driving integrated circuit.

12. The display device according to claim 8, wherein the first clock pseudo line and all the plurality of first clock pseudo lines are connected to a same source driving integrated circuit, and the second clock pseudo line and all the plurality of second clock pseudo lines are connected to a same source driving integrated circuit.

13. The display device according to claim 2, further comprising:

a multiplexer connected to the plurality of source driving integrated circuits and controlled by a multiplexer control signal applied through a multiplexer control line to supply the data voltage to the plurality of pixels; and a multiplexer pseudo line disposed in the non-display area of the display panel, and applied with a multiplexer pseudo signal with a phase inverted from that of the multiplexer control signal from the plurality of source driving integrated circuits.

14. The display device according to claim 13, wherein at least one multiplexer pseudo switch is disposed between the multiplexer pseudo line and each of the plurality of source driving integrated circuits.

15. The display device according to claim 14, wherein the multiplexer pseudo line includes a plurality of multiplexer pseudo lines, and each of the plurality of multiplexer pseudo lines is connected to at least one of the plurality of source driving integrated circuits through the at least one multiplexer pseudo switch.

16. The display device according to claim 1, wherein the clock pseudo line has a wavy shape.

17. The display device according to claim 1, wherein a width of the clock pseudo line is larger than a width of the clock line.

18. The display device according to claim 1, wherein a length of the clock pseudo line is same to a length of the clock line.

19. The display device according to claim 1, wherein a radiation amount of the clock signal is equal to a radiation amount of the clock pseudo signal.

20. The display device according to claim 1, wherein the clock pseudo line is connected to the data driver, wherein the clock pseudo line is not electrically connected to the gate driver, wherein the clock pseudo line is not electrically connected to the timing controller, wherein the clock pseudo line does not provide the clock pseudo signal the data driver, and wherein the clock pseudo line does not provide the clock pseudo signal the timing controller.

* * * * *